United States Patent
Steenkiste et al.

(10) Patent No.: US 7,698,121 B2
(45) Date of Patent: Apr. 13, 2010

(54) DEVICE AND METHOD FOR PROGRAMMABLE WIDEBAND NETWORK EMULATION

(75) Inventors: Peter A. Steenkiste, Pittsburgh, PA (US); Glenn Judd, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1074 days.

(21) Appl. No.: 11/274,530

(22) Filed: Nov. 15, 2005

(65) Prior Publication Data

US 2006/0209866 A1    Sep. 21, 2006

Related U.S. Application Data

(60) Provisional application No. 60/628,236, filed on Nov. 16, 2004.

(51) Int. Cl.
   *G06F 9/455* (2006.01)
   *H04L 12/26* (2006.01)

(52) U.S. Cl. .............................. 703/23; 703/21; 370/241

(58) Field of Classification Search .................. 703/23, 703/21, 22, 28; 455/67.7, 67.11; 370/241; 709/220, 223
   See application file for complete search history.

(56) References Cited

U.S. PATENT DOCUMENTS

| | | | |
|---|---|---|---|
| 4,105,958 A | 8/1978 | Pierce et al. | |
| 4,464,791 A | 8/1984 | Eness | |
| 4,679,248 A | 7/1987 | McKeown | |
| 4,737,928 A | 4/1988 | Parl et al. | |
| 4,977,607 A | 12/1990 | Maucksch et al. | |
| 5,062,148 A | 10/1991 | Edwards | |
| 5,191,594 A | 3/1993 | Argo et al. | |
| 5,233,628 A | 8/1993 | Rappaport et al. | |
| 5,355,519 A | 10/1994 | Hasegawa | |
| 5,465,393 A | 11/1995 | Frostrom et al. | |
| 5,794,128 A * | 8/1998 | Brockel et al. | 455/67.11 |
| 5,862,455 A | 1/1999 | Martin et al. | |
| 5,973,638 A | 10/1999 | Robbins et al. | |
| 6,058,261 A | 5/2000 | Rapeli | |
| 6,061,394 A | 5/2000 | Itahara | |
| 6,134,514 A * | 10/2000 | Liu et al. | 703/17 |

(Continued)

OTHER PUBLICATIONS

Jeff R. Papenfuss et al., "A TMS320C6701/FPGA Based Frequency Selective RF Channel Simulator Using IF Sampling", Aug. 2000, Texas Instruments DSPS Fest, pp. 1-6.*

(Continued)

*Primary Examiner*—Jason Proctor
(74) *Attorney, Agent, or Firm*—Jones Day; Edward L. Pencoske

(57) ABSTRACT

An emulator for emulating a wireless network comprised of a plurality of RF nodes is comprised of a programmable controller for emulating the movements of the plurality of RF nodes within an emulated space. The controller provides both information and control signals based on the emulated movements. A programmable logic core receives a plurality of signals from the plurality of RF nodes and emulates signal propagation based on the information from the controller. A plurality of signal generation and conversion cards are interposed between the programmable logic core and the RF nodes. The signal generation and conversion cards are responsive to the control signals. Because of the rules governing abstracts, this abstract should not be used to construe the claims.

28 Claims, 16 Drawing Sheets

U.S. PATENT DOCUMENTS

| | | | |
|---|---|---|---|
| 6,236,363 | B1 | 5/2001 | Robbins et al. |
| 6,571,082 | B1 * | 5/2003 | Rahman et al. .......... 455/67.11 |
| 6,600,926 | B1 | 7/2003 | Widell et al. |
| 6,618,696 | B1 | 9/2003 | Dean et al. |
| 6,724,730 | B1 * | 4/2004 | Mlinarsky et al. ........... 370/241 |
| 6,922,395 | B1 | 7/2005 | Elliott et al. |
| 7,620,368 | B2 * | 11/2009 | Wang et al. .............. 455/67.11 |
| 2003/0088390 | A1 | 5/2003 | Jamsa et al. |
| 2003/0236089 | A1 * | 12/2003 | Beyme et al. ............... 455/423 |
| 2004/0044506 | A1 | 3/2004 | Meinila et al. |
| 2004/0088628 | A1 | 5/2004 | Poutanen et al. |
| 2005/0008109 | A1 | 1/2005 | Kemppainen et al. |
| 2005/0053008 | A1 | 3/2005 | Griesing et al. |

OTHER PUBLICATIONS

Priya Mahadevan et al., "Emulating Large-Scale Wireless Networks using ModelNet", Sep. 2002, MOBICOM'02, pp. 1-2.*

H.N. Kheirallah et al., "M-Profile Ray Tracing Technique for Multipath Propagation", Jan. 1987, Electronics Letters, vol. 23, No. 2, pp. 82-83.*

Kimmo Kuusilinna et al., "Describing MIMO Designs for Rapid Prototyping in the BEE Environment", Sep. 2004, European Signal Processing Conference 2004, pp. 693-696.*

Glenn Judd et al., "Repeatable and Realistic Wireless Experimentation through Physical Emulation", 2004, ACM SIGCOMM Computer Communications Review, pp. 63-68.*

B. Noble, M. Satyanarayanan, G. Nguyen, and R. Katz, Trace-Based Mobile Network Emulation, Proc. of SIGCOMM 1997, Sep. 1997.

P. Mahadevan, K. Yocum, and A. Vahdat, Emulating Large-Scale Wireless Networks Using Modelnet, Poster and Abstract Mobicom 2002, Sep. 2002.

T. Lin, S. Midkiff, and J. Park, A Dynamic Topology Switch for the Emulation of Wireless Mobile Ad Hoc Networks, Proc. of the 27th Annual IEEE Conference on Local Computing Networks (LCN'02), Nov. 2002.

E. Hernandez and S. Helal, "RAMON: Rapid-Mobility Network Emulator", Proc. of 27th IEEE Conference on Local Computer Networks (LCN'02), Nov. 2002.

B. White, J. Lepreau, and S. Guruprasad, Lowering the Barrier to Wireless and Mobile Experimentation, Proc. of HotNets-I, Oct. 2002.

PROPSim, Propsim C8 Wideband Multi-Channel Simulator, http://www.propsim.net/, 2008.

Spirent Communications, TAS4500 Flex5 RF Channel Emulator, http://www.spirent-communications.com/, 2008.

R. Punnoose, P. Nikitin, J. Broch, and D. Stancil, "Optimizing Wireless Network Protocols Using Real-Time Predictive Propagation Modeling", Proc. of the Radio and Wireless Conference (RAWCON) 1999, Aug. 1999.

K. Fall, Network Emulation in the Vint/NS Simulator, Proc. of The Fourth IEEE Symposium on Computers and Communications, Jul. 1999.

J. Zhou, Z. Ji, M. Varshney, Z. Xu, Y. Yang, M. Marina, R. Bagrodia, Whynet: A Hybrid Testbed for Large-Scale, Heterogeneous and Adaptive Wireless Networks, WiNTECH Sep. 2006.

D. Raychaudhuri, I. Seskar, M. Ott, S. Ganu, K. Ramachandran, H. Kremo, R. Siracusa, H. Liu, and M. Singh, Overview of the Orbit Radio Grid Testbed for Evaluation of Next-Generation Wireless Network Protocols, Proc. of WCNC 2005, New Orleans, LA, Mar. 2005.

P. De, A. Raniwala, S. Sharma, and T. Chiueh, MiNT: A Miniaturized Network Testbed for Mobile Wireless Research, Proc. of Infocom 2005, Miami, FL, Mar. 2005.

SPIRENT Communications, SR5500 Wireless Channel Emulator, Dec. 2007.

M. Varshney, Z. Xu, S. Mohan, Y. Yang, D. Xu, R. Bagrodia, WHYNET: A Framework for In-Situ Evaluation of Heterogeneous Mobile Wireless Systems, WiNTECH Sep. 2007.

M. Takai, et al., Scalable Testbed for Next-Generation Wireless Networking Technologies, Proc. First Int'l Conf. of TRIDENT, 2005.

* cited by examiner a) Card Output (mixed down) EVM: 4.8% b) ADC-DAC EVM: 6% c) Emulator Prototype EVM: 7.7%

DEVICE AND METHOD FOR PROGRAMMABLE WIDEBAND NETWORK EMULATION

CROSS REFERENCE TO RELATED APPLICATIONS

The present application claims priority from U.S. application Ser. No. 60/628,236 filed Nov. 16, 2004 and entitled Repeatable and Realistic Wireless Experimentation Through Physical Emulation, the entirety of which is hereby incorporated by reference.

STATEMENT REGARDING FEDERALLY SPONSORED RESEARCH

This invention was made with government support under Office National Science Foundation Grant Number CCR-0205266. The government has certain rights in this invention.

BACKGROUND

The present disclosure is directed generally to emulators and, more particularly, to emulators used for wireless-network environments As wireless network deployment and use become ubiquitous, it is increasingly important to make efficient use of the finite bandwidth provided. Unfortunately, research aimed at evaluating and improving wireless network protocols is hindered by the inability to perform repeatable and realistic experiments.

Techniques that have proven successful for analyzing wired networks are inadequate for analyzing wireless networks since they are fundamentally different. While the physical layer can frequently be ignored in wired networks, in wireless networks the physical layer fundamentally affects operation at all layers of the protocol stack in complex ways. Links are no longer constant, reliable, and physically isolated from each other, but are variable, error-prone, and share a single medium with each other and with external uncontrolled sources. As a result, traditional methods of experimentation have difficulty satisfying the needs of wireless researchers.

An ideal method of wireless experimentation would possess the following properties: repeatability and experimental control, layer 1-4 realism, the ability to run real applications, configurability, the ability to modify wireless device behavior, automation and remote management, support for a large number of nodes, isolation from production networks, and integration with wired networks and testbeds. We now discuss how alternative methods of experimentation fare with respect to this list of desirable properties.

The most direct method of addressing realism is to conduct experiments using real hardware and software in various real world environments. Unfortunately, this approach faces serious repeatability issues because the behavior of the physical layer is tightly coupled to the physical environment and precise conditions under which an experiment is conducted. The mobility of uncontrolled radio sources, physical objects, and people makes these conditions nearly impossible to reproduce. It is also difficult to avoid affecting co-located production networks. Moreover, configurability and management of even a small number of mobile nodes distributed in three dimensions is cumbersome; this lack of manageability also makes integration with external networks problematic.

For these reasons, many researchers have understandably embraced simulation as a means of evaluation. This approach solves the problem of repeatability, configurability, manageability, modifiability, and (potentially) integration with external networks, but faces formidable obstacles in terms of realism. Wireless simulators are confronted with the difficult task of recreating the operation of a system at all layers of the network protocol stack as well as the interaction of the system in the physical environment. To make the problem tractable, simplifications are typically made throughout the implementation of the simulator. Even fundamental tasks such as deciding what a received frame looks like diverge greatly from the operation of real hardware. See Takai et al. "Effects of Wireless Physical Layer Modeling in Mobile Ad Hoc Networks", Proc. of MobiHoc 2001, October 2001.

In addition, while wireless technology is undergoing rapid advances, wireless simulators, in particular open source wireless simulators, have lagged significantly behind these advances as discussed below. For several years now, ns-2 has been the de facto standard means of experimental evaluation for the wireless networking community. See, S. McCanne and S. Floyd. UCB/LBNL/VINT Network Simulator—ns (version 2), April 1999. Yet ns-2's wireless support has not kept pace with current technology, and is targeted towards the original 802.11 standard developed in 1997. Even this support, however, is inexact as ns-2 does not support automatic rate selection, uses a non-standard preamble, and contains an incorrect value for 802.11 ACK timeout value. In addition, ns-2's physical layer is particularly simple. See Takai, et al, supra. As a result, some researchers are opting to use commercial simulators such as QualNet [Scalable Network Tech. Qualnet] and OpNet [OPNET Tech. Opnet] because they claim better support for current standards. Despite these claims, however, it is unclear how well these simulators reflect actual hardware.

The aforementioned issues with simulators, and a desire to avoid long simulation times, have caused some researchers to adopt emulation as a means of evaluation. Emulation retains simulation's advantages of repeatability and manageability, while potentially mitigating the issue of realism. Unfortunately, as discussed below, with the exception of a few very small-scale emulators, and emulators hardwired to a particular physical location, these emulators have typically adopted extremely simplified MAC and physical layers. As the operation of these layers is fundamental to the operation of a wireless network, it is unclear that these emulators gain any realism over existing simulators.

Emulation has proven to be a useful technique in wired networking research, and it has an even larger potential in the wireless domain. See, B. White, J. Lepreau, L. Stoller, R. Ricci, S. Guruprasad, M. Newbold, M. Hibler, C. Barb, and A. Joglekar. An integrated experimental environment for distributed systems and networks. *Proc. of OSDI* 2002, December 2002; A. Vahdat, K. Yocum, K. Walsh, P. Mahadevan, D. Kostic, J. Chase, and D. Becker. "scalability and accuracy in a large-scale network emulator". *Proc. of OSDI* 2002, December 2002.

A common approach that has been taken for wireless emulation is to capture the behavior of a wireless network in terms of parameters such as capacity and error rates and then use a wired network to emulate this behavior. This has the advantage of allowing the use of real endpoints running real applications in real time. The wireless MAC and physical layers, however, are only very crudely simulated. For this reason, it is unclear whether or not this approach can obtain more realistic results than pure simulation. See, B. Noble, M. Satyanarayanan, G. Nguyen, and R. Katz. Trace-based mobile network emulation. *Proc. of SIGCOMM* 1997, September 1997; P Mahadevan, K. Yocum, and A. Vahdat. Emulating large-scale wireless networks using modelnet. *Poster and Abstract Mobicom 2002*, September 2002; T. Lin, S. Midkiff, and J. Park. A dynamic topology switch for the emulation of wireless mobile ad hoc networks. *Proc. of the 27th Annual IEEE Conference on Local Computer Networks (LCN'02)*, November 2002.

More recently efforts have been made to develop RF emulators that accurately emulate down to the physical layer. RAMON [E. Hernandez and S. Helal. "ramon: Rapid mobility network emulator". *Proc. of the 27th IEEE Conference on Local Computer Networks (LCN'02)*, November 2002.] uses three programmable attenuators to allow emulation of the signals between a single mobile node and two base stations. While useful for the intended application of mobile IP roaming investigation, the inability to independently control all signal paths and the cost of programmable attenuators severely limits this approach.

B. White, J. Lepreau, and S. Guruprasad. Lowering the barrier to wireless and mobile experimentation. *Proc. of HotNets-I*, October 2002, proposes extending Emulab into the wireless domain using either fixed wireless nodes scattered in a building or passive carriers to carry wireless nodes. Clearly this approach can achieve a high degree of realism, but has serious obstacles in terms of control and repeatability (because this is essentially a wireless testbed). As there can be significant uncontrolled interference, this approach can only hope to achieve what the authors term "coarse repeatability". In contrast, our approach allows for far greater control and repeatability.

The most functionally similar approach to the wireless emulator that we have developed is provided by commercial channel emulators. See, PROPSim. Propsim c8 wideband multichannel simulator, Spirent Communications. Tas4500 flex5 rf channel emulator. The goal of these emulators, however, is quite different. Rather than supporting emulation of all channels in a wireless network (hundreds of channels may be required), commercial channel emulators are designed to support very fine-grained emulation of the wireless channel between either a pair of devices or between a small number of base stations and a small number of mobile devices (with the total of both being less than the maximum number of channels which is typically no more than eight). Moreover, channel emulators require the addition of external components to support half-duplex transceivers that are common in wireless data networks. Although channel emulators are useful for equipment vendors evaluating a new device, the limited scale, lack of support for complete interaction between all nodes, and lack of support for half-node duplex nodes make commercial channel emulators an unattractive option for wireless network emulation.

BRIEF SUMMARY OF THE INVENTION

We have developed a programmable, wireless emulator that enables both realistic and repeatable wireless experimentation and testing by accurately emulating wireless signal propagation in a physical space. Unlike previous network experimentation and testing approaches, this emulator provides a real MAC layer and a realistic physical layer while avoiding adopting an uncontrollable or locale-specific architecture. The key technique we use to accomplish this is digital emulation of signal propagation using programmable logic, e.g. an FPGA (field programmable gate array).

This emulator provides an attractive middle ground between pure simulation and wireless testbeds. To a large degree, this emulator maintains the repeatability, configurability, isolation from production networks, and manageability of simulation while obtaining much of the realism of hardware testbeds, and in many cases, this emulator should provide a superior platform for wireless experimentation. This emulator is not, however, a complete replacement for simulation and real world evaluation. Simulation is still useful in cases where a very large-scale experiment is needed. Real world evaluation is still useful for verifying the operation of the emulator in real settings or for settings with physical environments that are not currently reproduced in the emulator.

BRIEF DESCRIPTION OF THE DRAWINGS

For the present disclosure to be easily understood and readily practiced, the disclosure will be now be described, for purposes of illustration and not limitation, in conjunction with the following figures, wherein.

DETAILED DESCRIPTION

Our discussion proceeds as follows: Section 1 describes the architecture of the emulator we have developed; Section 2 discusses an early proof of concept emulator prototype; Section 3 presents several experiments that illustrate several aspects this prototype's functionality; Section 4 discusses signal propagation modeling, and Section 5 concludes our discussion.

Section 1 Emulator Architecture

Figure 1:
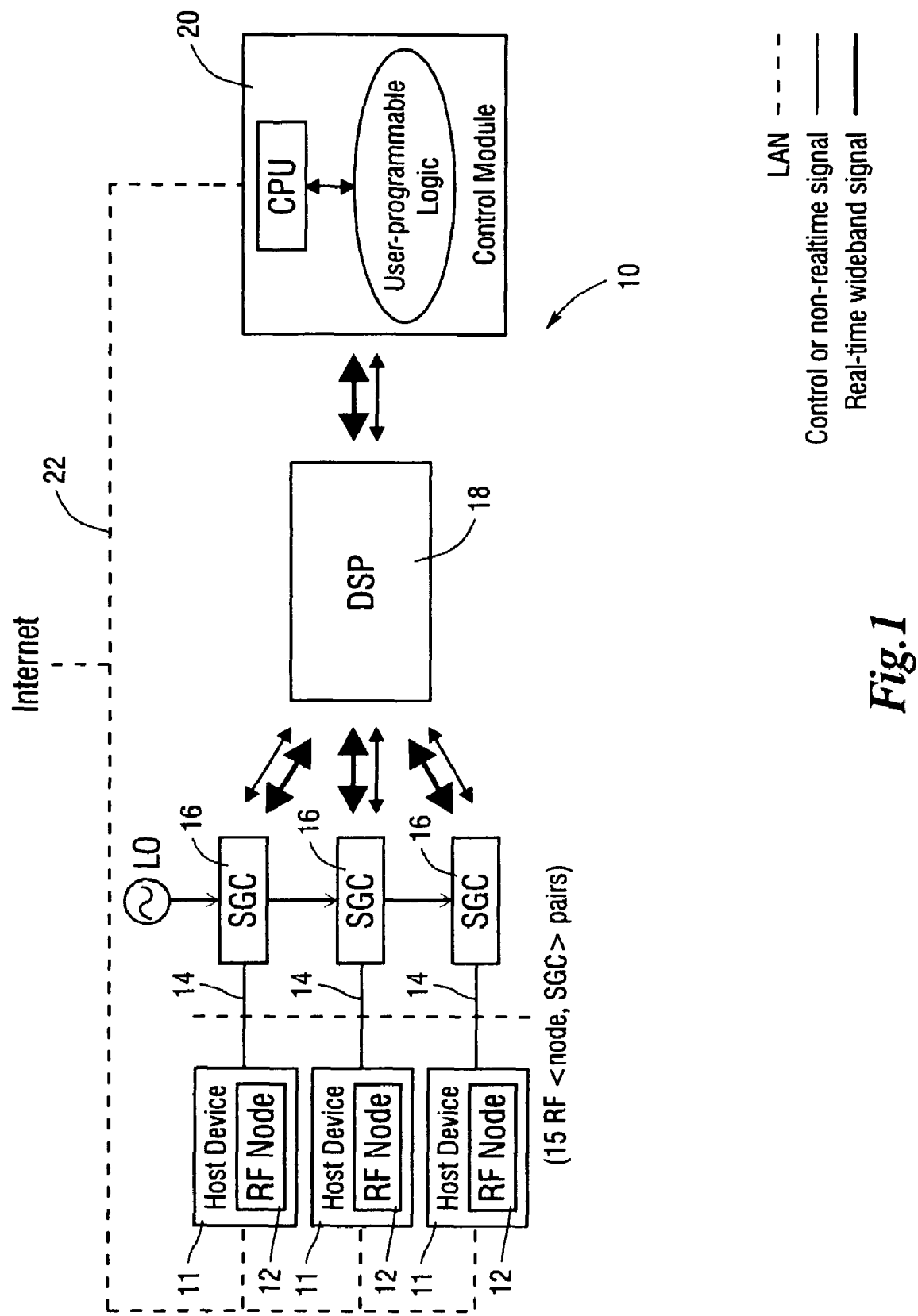
FIG. 1 shows the architecture and typical single DSP operation of the disclosed emulator.

The architecture of the disclosed emulator 10 is shown in FIG. 1. A number of wireless host devices 11 (e.g. laptops, access points, or any wireless device in the supported frequency range) are connected to the emulator 10 through cables 14 attached to the antenna port of their wireless line cards. We refer to the antenna represented by this connection as an RF node 12. Each RF node corresponds to a single antenna, so a single device can be represented by multiple RF nodes. Unlike the prior art, a half-duplex RF node is supported by a single RF port input/output and requires no external components. For each RF node 12, the RF signal transmitted by its line card is sent to a signal generation and conversion module (SGC) 16 where it is mixed with the local oscillator (LO) signal down to baseband and is then digitized. The SGC modules 16 contain programmable logic that may then manipulate the signal according to user specified functions.

The digitized signals are fed into one or more DSP engines 18 which are each built around one or more programmable logic cores, e.g. FPGAs. The DSP engine 18 models the effects of signal propagation (e.g. large-scale attenuation and small-scale fading) on each signal path between each pair of RF nodes 12, although the manner in which the DSP 18 emulates signal propagation is completely user programmable. Finally, for each RF node 12, the DSP 18 combines the appropriately processed input signals from all the other RF nodes 12. This signal is then sent out to each node's SGC module. After the SGC module receives the signal from the DSP, the received signal is converted from digital to RF (analog) and sent to the wireless line card through the antenna port.

Figure 21D:
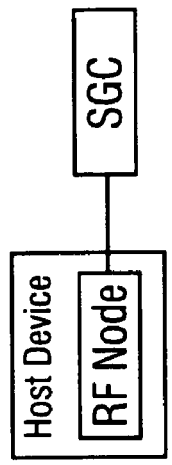
FIG. 21 illustrates sample configurations of host devices, RF nodes, control deamons, and SGC modules.
Figure 21E:
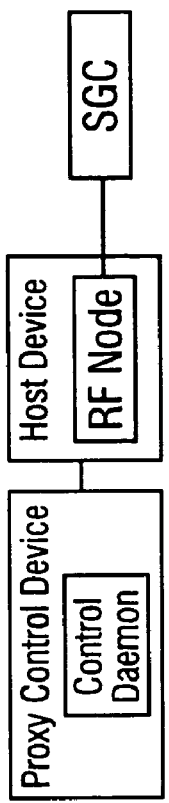
Figure 21A:
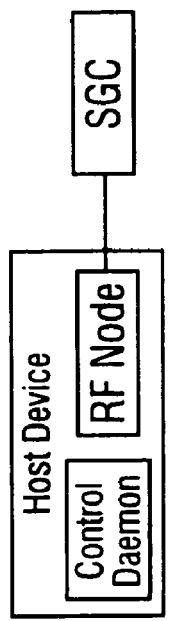
Figure 21B:
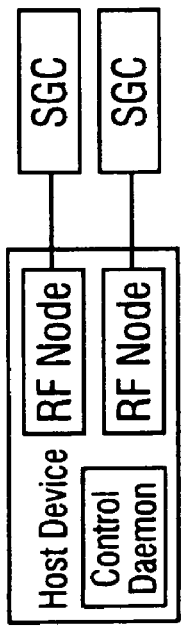
Figure 21C:
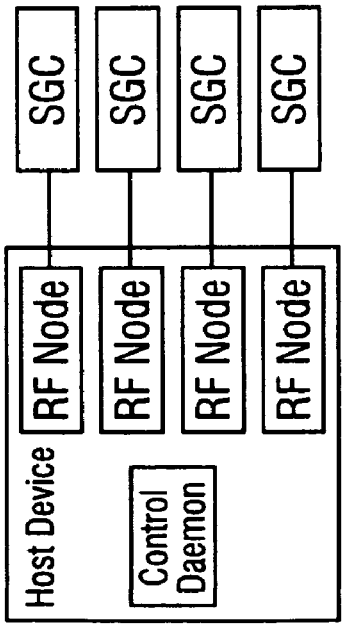

The operation of the emulator 10 is managed by the emulation controller 20, which coordinates the movement of RF nodes 12 (and possibly physical objects) in the emulated physical space. The emulation controller 20 uses location information (and other factors as dictated by the signal propagation model in use) to control the emulation of signal propagation within this emulated environment. In addition, the emulation controller 20 coordinates node (and object) movement in physical space with the sending of data and the operation of applications on the RF nodes 12. Each RF node 12 runs a small daemon, as discussed below in conjunction with FIG. 21, that allows the emulation controller 20 to control its operation via a wired network 22. RF nodes 12 that are not capable of running code may require a proxy to run the daemon on their behalf as discussed below in conjunction with FIG. 21e.

Figure 2:
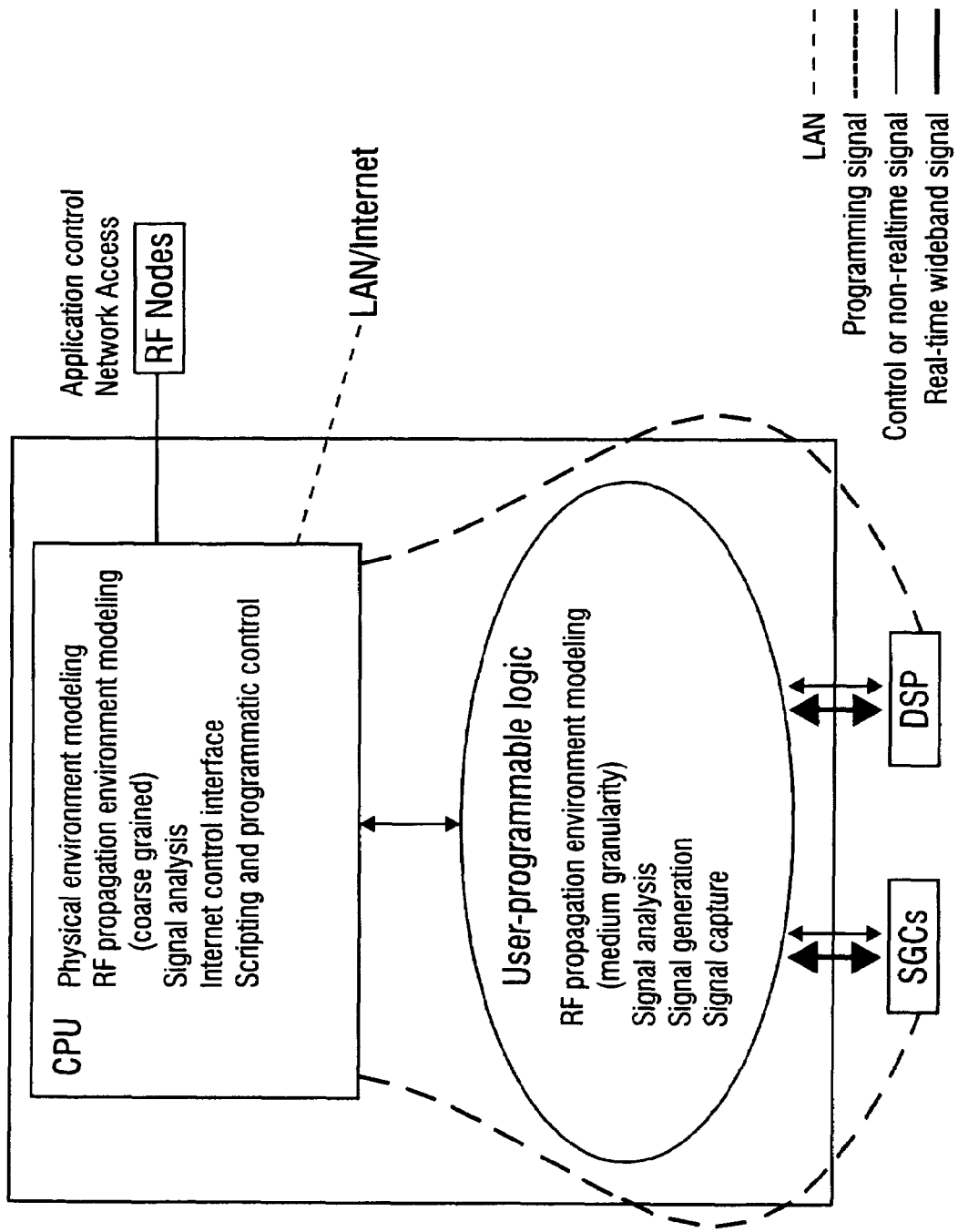
FIG. 2 illustrates one method of operating the control module

Connecting the emulation controller 20 to an external network as shown in FIG. 2 allows remote management of the emulator 10. In addition, individual nodes 12 connected to the emulator 10 may be connected to external networks (not shown) to allow individual nodes 12 access to the Internet at large or to allow the emulator 10 to be used in conjunction with testbeds such as PlanetLab [L. Peterson, T. Anderson, D. Culler, and T. Roscoe. A blueprint for introducing disruptive technology into the internet. *Proc. of HotNets-I*, October 2002] or Emulab [B. White, J. Lepreau, L. Stoller, R. Ricci, S. Guruprasad, M. Newbold, M. Hibler, C. Barb, and A. Joglekar. An integrated experimental environment for distributed systems and networks. *Proc. of OSDI* 2002, December 2002.].

In our current embodiment, we use a path based channel model which has 232 paths available. Those paths could all be assigned to a single channel, we could have 232 single path channels, or anything in between. This provides a great deal of flexibility in the allocation of resources. Also, the large number of paths enables the emulation of an entire network, not a few channels as is typical in the prior art. Depending on the hardware used to implement the emulator, other numbers of paths may be available.

Figure 3:
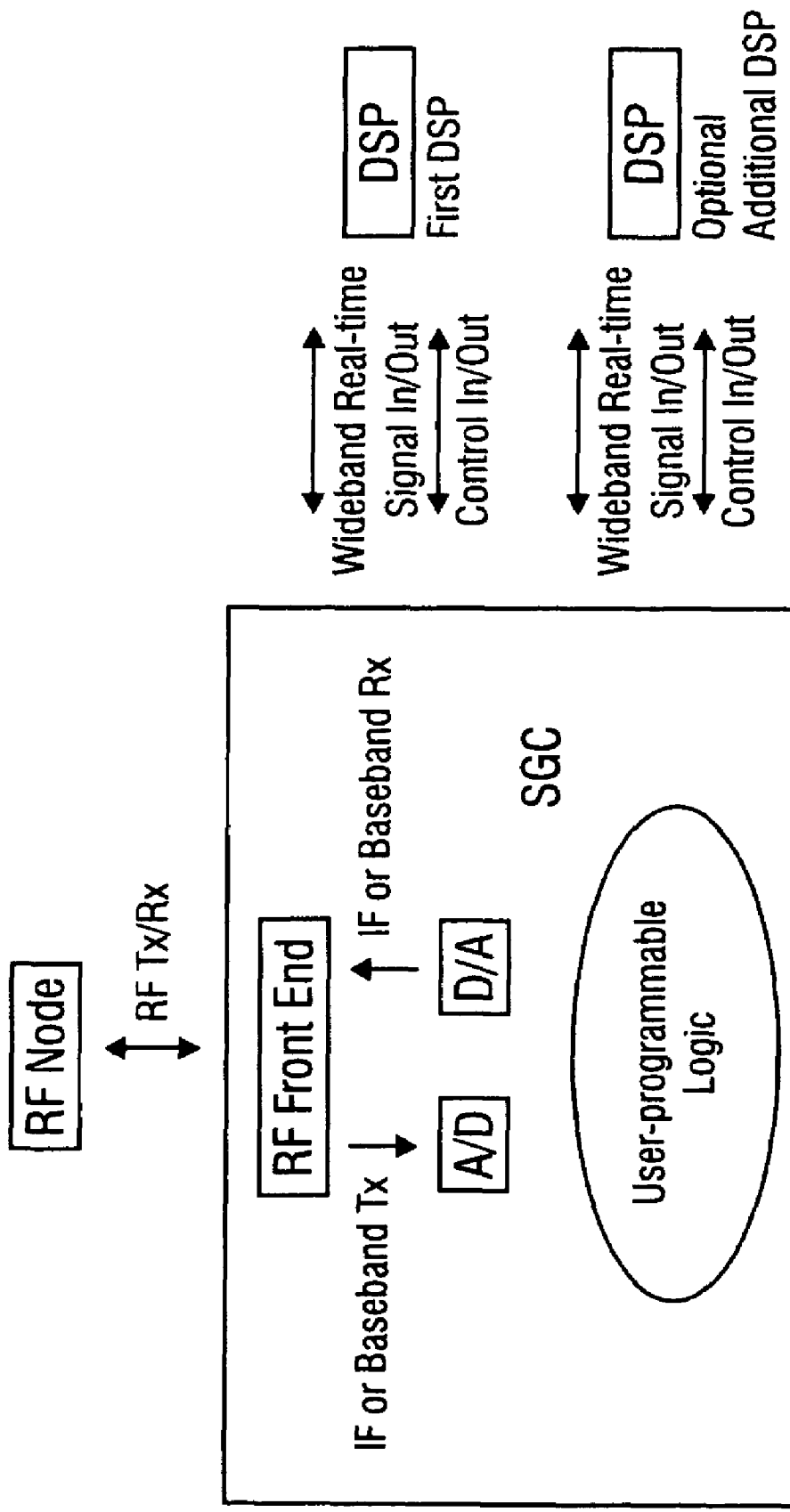
FIG. 3 illustrates typical SGC module operation where RF input is converted by the SGC's RF front end to either an IF or baseband. The SGC's output is converted by the RF front end up to RF.

Returning now to a more specific discussion of the components of the system shown in FIG. 1, as mentioned, the RF nodes 12 represent an antenna attached to a wireless host device 11. Several major modes of RF node operation are supported:

RF frequency. In this mode (shown in FIG. 3), RF nodes transmit and receive at their native RF frequency. On RF node transmit, the SGC module's RF front end downconverts this frequency to either IF or baseband before digitizing the signal. On receive, the SGC module converts the incoming digital signal to analog, the SGC module's RF front end then upconverts the outgoing IF or baseband to RF.

Figure 4:
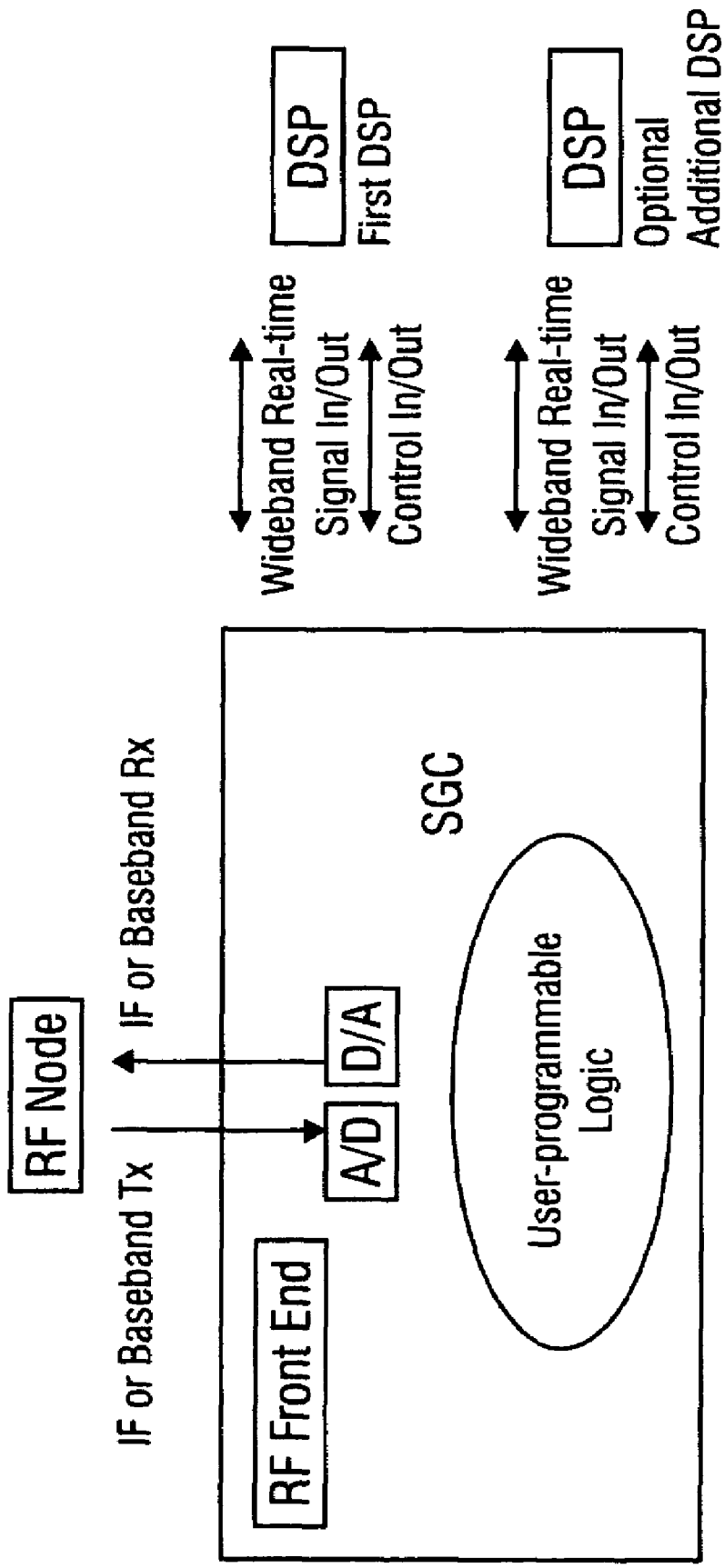
FIG. 4 Illustrates SGC module operation where the RF node I/O is either IF or baseband and hence the SGC's RF front end can be bypassed.

IF frequency or baseband. In this mode (shown in FIG. 4), RF nodes transmit and receive at IF or baseband directly and the SGC module's RF front end is bypassed.

Figure 5:
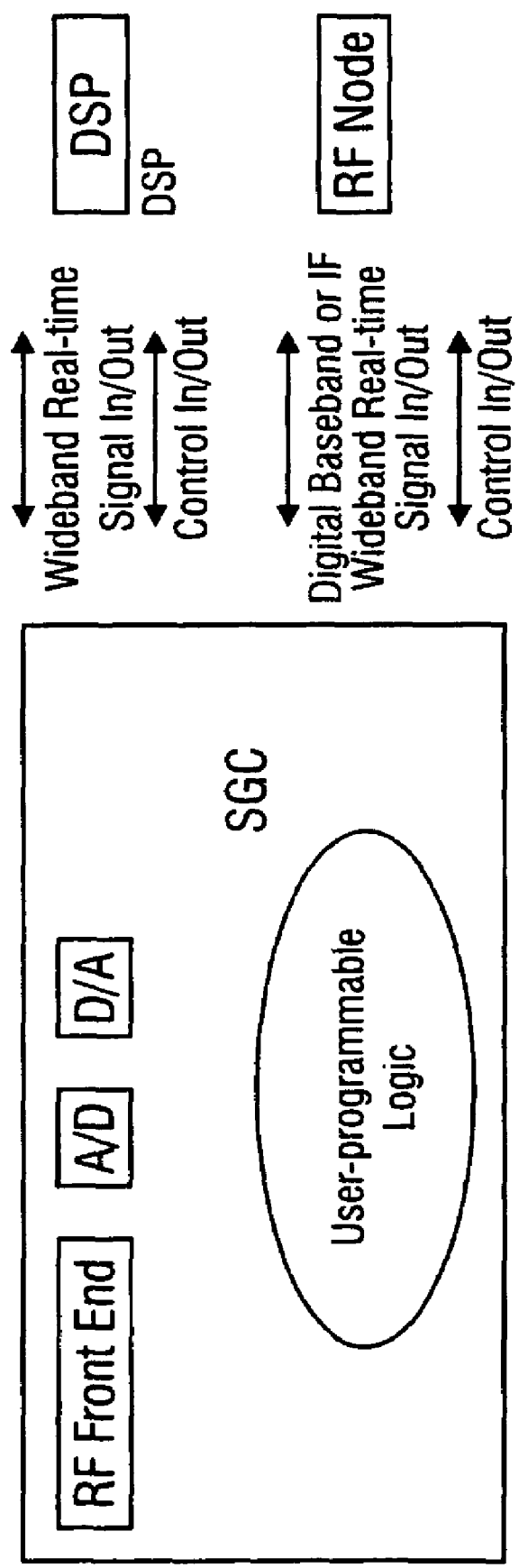
FIG. 5 illustrates SGC module operation where the RF node I/O is digital IF or baseband.

Digital IF or baseband. In this mode (shown in FIG. 5), RF nodes communicate digitally with the SGC module, and the SGC module's RF front end, A/D converter, and D/A converter are bypassed.

Figure 6:
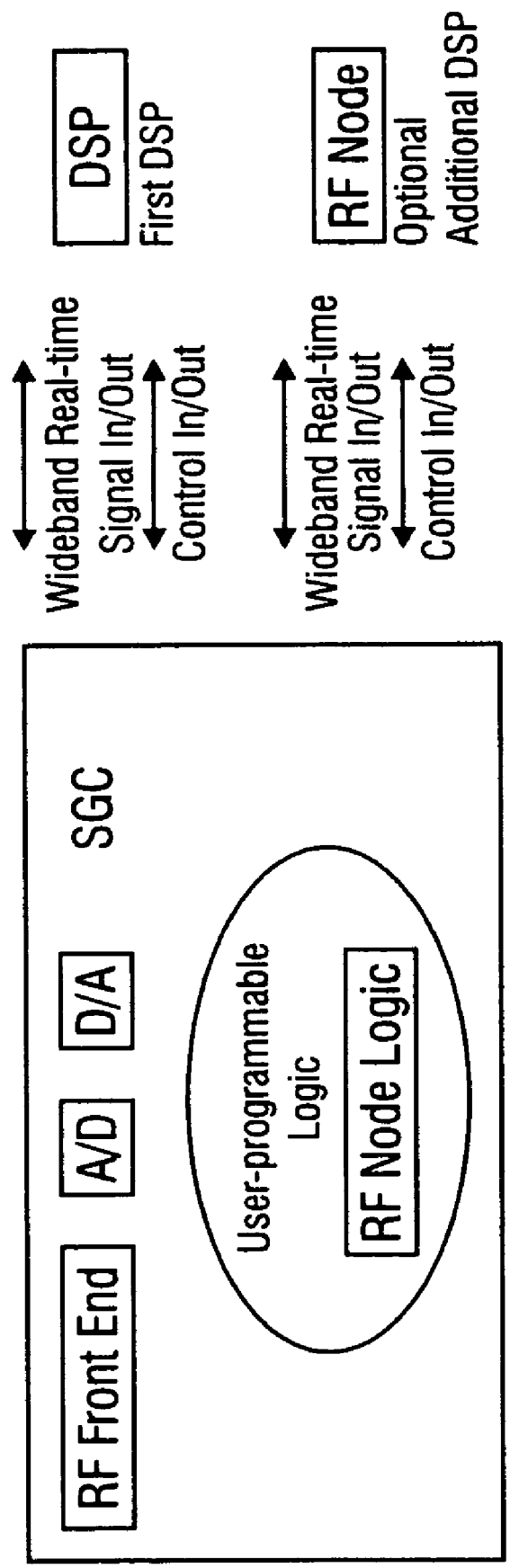
FIG. 6 illustrates SGC module operation where the programmable logic in the SGC is configured to operate a software defined radio (SDR) and accompanying RF node.

SDR (software defined radio) mode. In this mode (shown in FIG. 6 and FIG. 7), the SGC module is an SDR and accompanying RF node. The RF front end, A/D converter, and D/A converter are not used. The user-programmable logic is used, in this case, to emulate a complete radio or generate the desired signal.

The signal generation and conversion (SGC) module 16 is responsible for connecting RF nodes to the DSP. When the RF nodes are operating in an analog mode, the SGC module converts the signal to and from digital form as described supra. In digital baseband mode, the module may simply pass digital data between the RF node and the DSP. In SDR mode, the signal generation and conversion module may act as a full-blown SDR, or may simply generate a simple signal (e.g. white noise).

The SGC module 16 contains user-programmable logic which allows users to place arbitrary functionality in this module. The programmable logic on the SGC board may be used to offload some of the RF propagation emulation from the DSP module.

Figure 7:
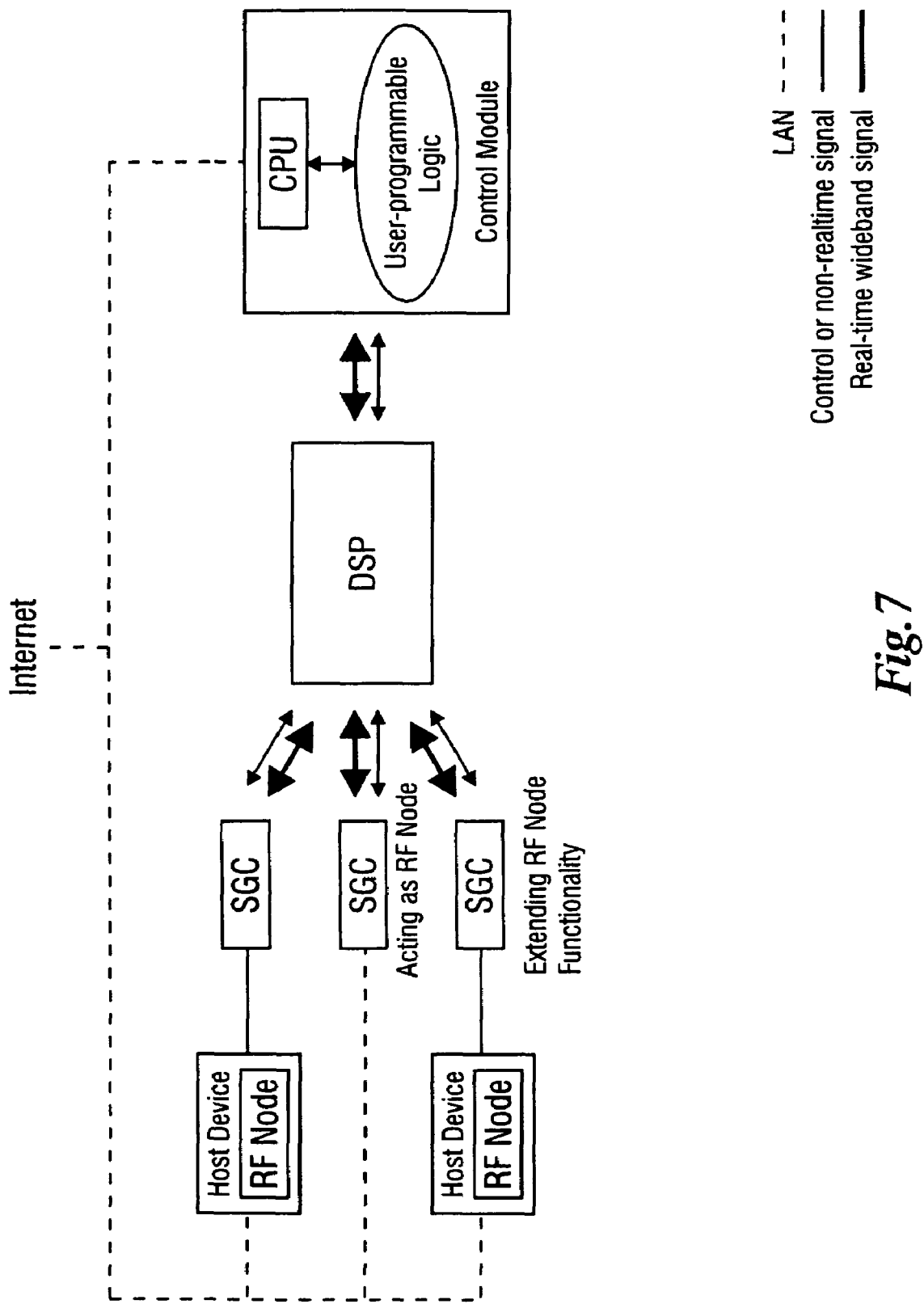
FIG. 7 illustrates typical single DSP operation with SGC operation alternatives.

The SGC module 16 can also be used to extend the functionality of RF nodes as shown in FIG. 7. For instance, an RF node with a fixed transmit power could employ the SGC to give the effect of an RF node with variable transmit power. In this way, limitations of the RF nodes wireless hardware can be overcome for the purposes of testing and experimentation.

Moreover, multiple SGC modules can be used to extend the functionality of a single RF node. For instance, a beam forming antenna could be implemented by connecting the RF output from the RF node to multiple SGC modules.

The SDR mode operation described supra may also be implemented using multiple SGC modules.

Figure 8:
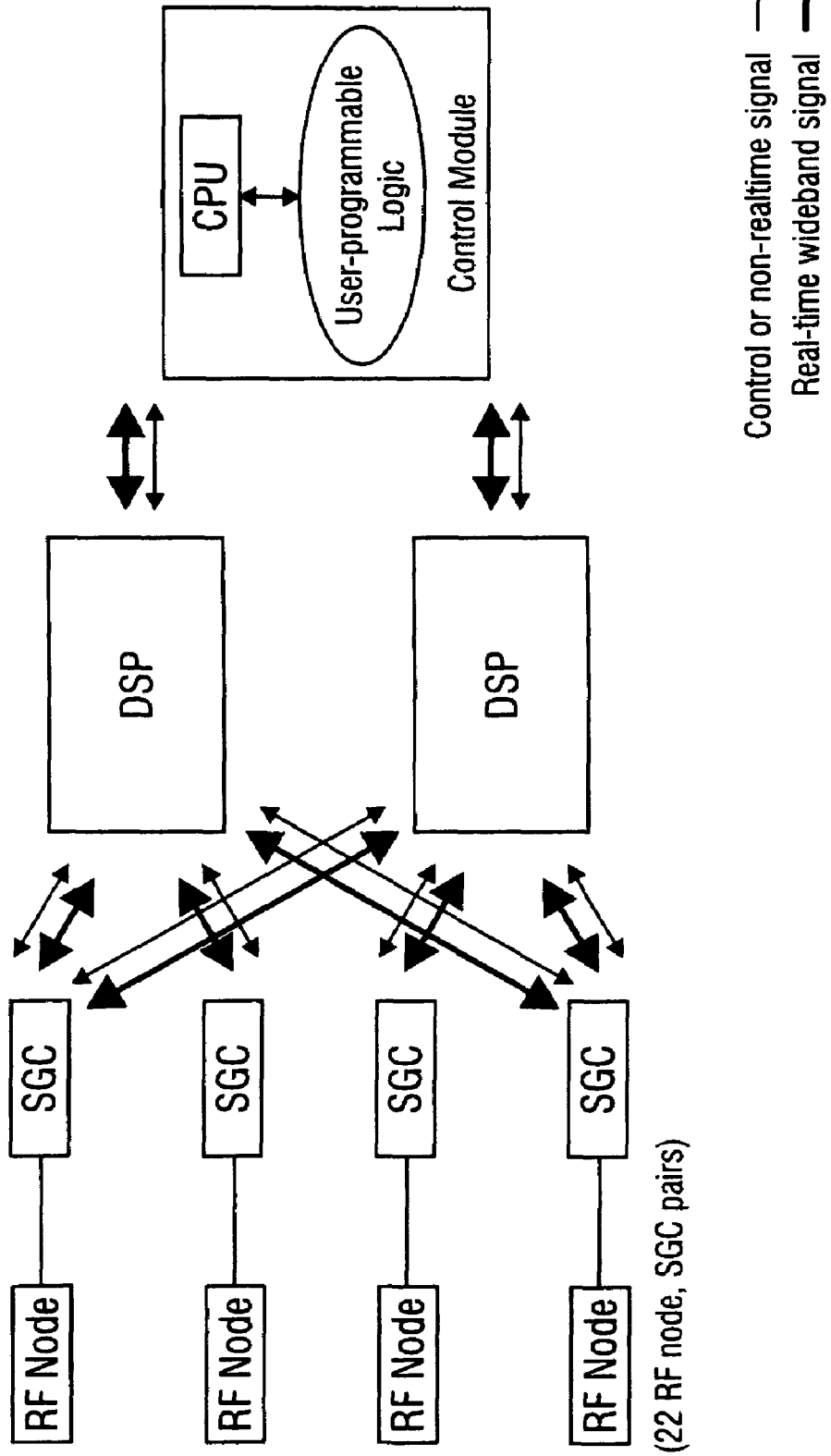
FIG. 8 illustrates how multiple SGC's can be connected to multiple DSPs to increase the number of all-to-all signal resources available for RF emulation.

SGC modules may be attached to multiple DSP modules as shown in FIG. 8 to allow for a richer signal propagation environment to be emulated. For instance, a path-based propagation emulation setup will support more signal paths if it is connected in this fashion.

Figure 9:
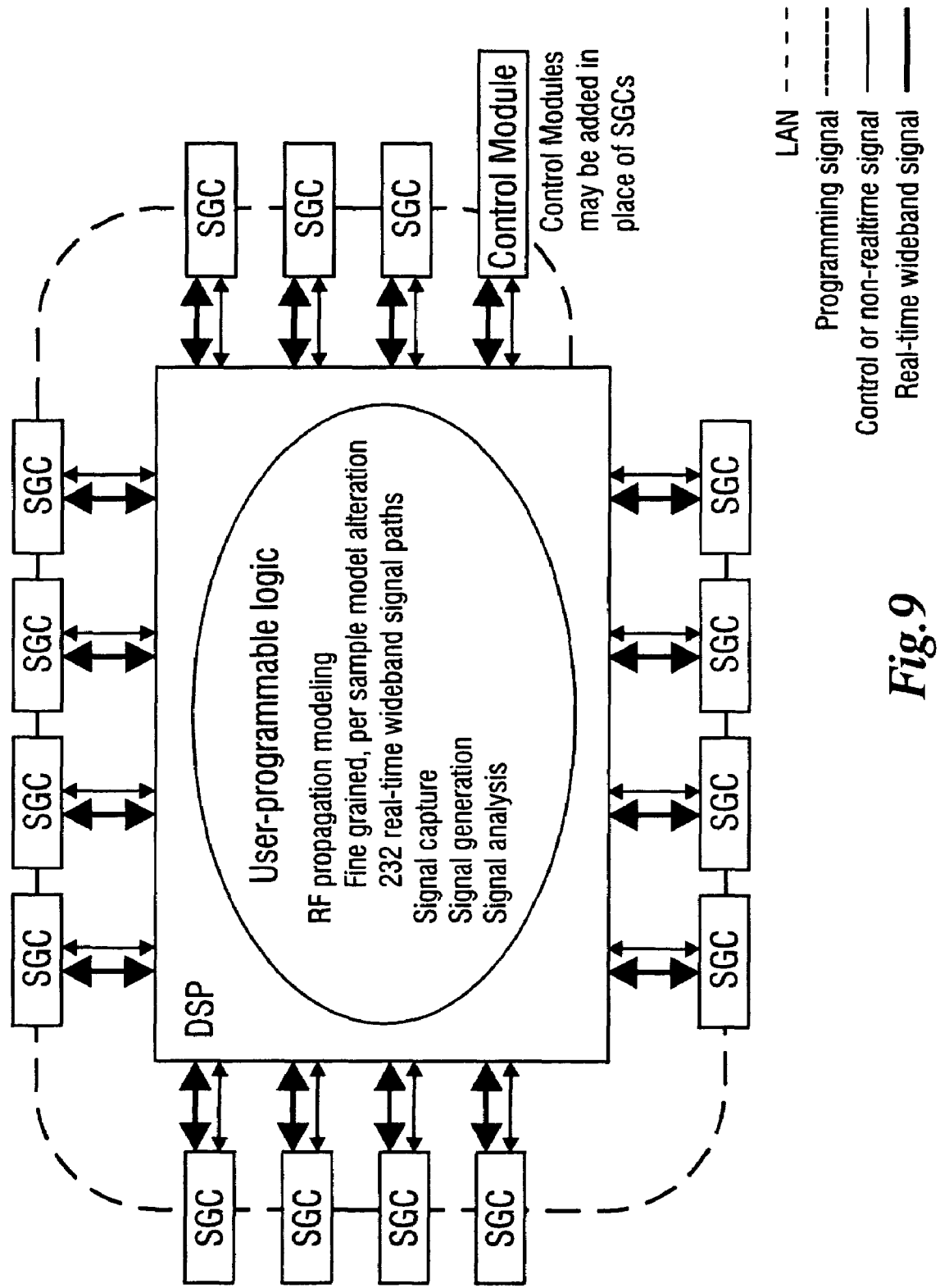
FIG. 9 illustrates the operation of the DSP engine.

The digital signal processing (DSP) engine 18, shown in FIG. 9, accepts RF node signals from the SGC modules, and is then responsible for emulating the RF propagation environment between all RF nodes. The use of programmable logic in the DSP module allows the propagation modeling to be done in an arbitrary user-specified fashion. In addition, the programmable nature of the SGC module, and the emulation control module allows these modules to assist the DSP in emulation.

In our current embodiment, the DSP engine models all channels between all pairs of RF nodes. Each pair of RF nodes has two channels between them, one for each direction. For each channel, the DSP engine in our current embodiment supports a certain number of signal paths. The precise number of paths in each channel can be specified by the users and the number used may be changed at run-time.

Our current embodiment supports a maximum of 232 signal paths for the current maximum of 15 RF nodes attached to a single DSP engine. The flexible nature of our emulator allows all 232 paths to be assigned to a single channel, or 1 channel might be assigned to all of the channels between the 15 RF nodes for a total of 210 signal paths.

The RF propagation modeling may be altered in an extremely fine-grained fashion (on a per sample basis.)

As discussed in the SGC section supra and shown in FIG. 8, SGCs may connect to multiple DSPs which operate in concert to overcome the RF node and signal path limitations of any one DSP engine. Our current embodiment supports connecting each SGC module to two DSP engines.

Figure 10:
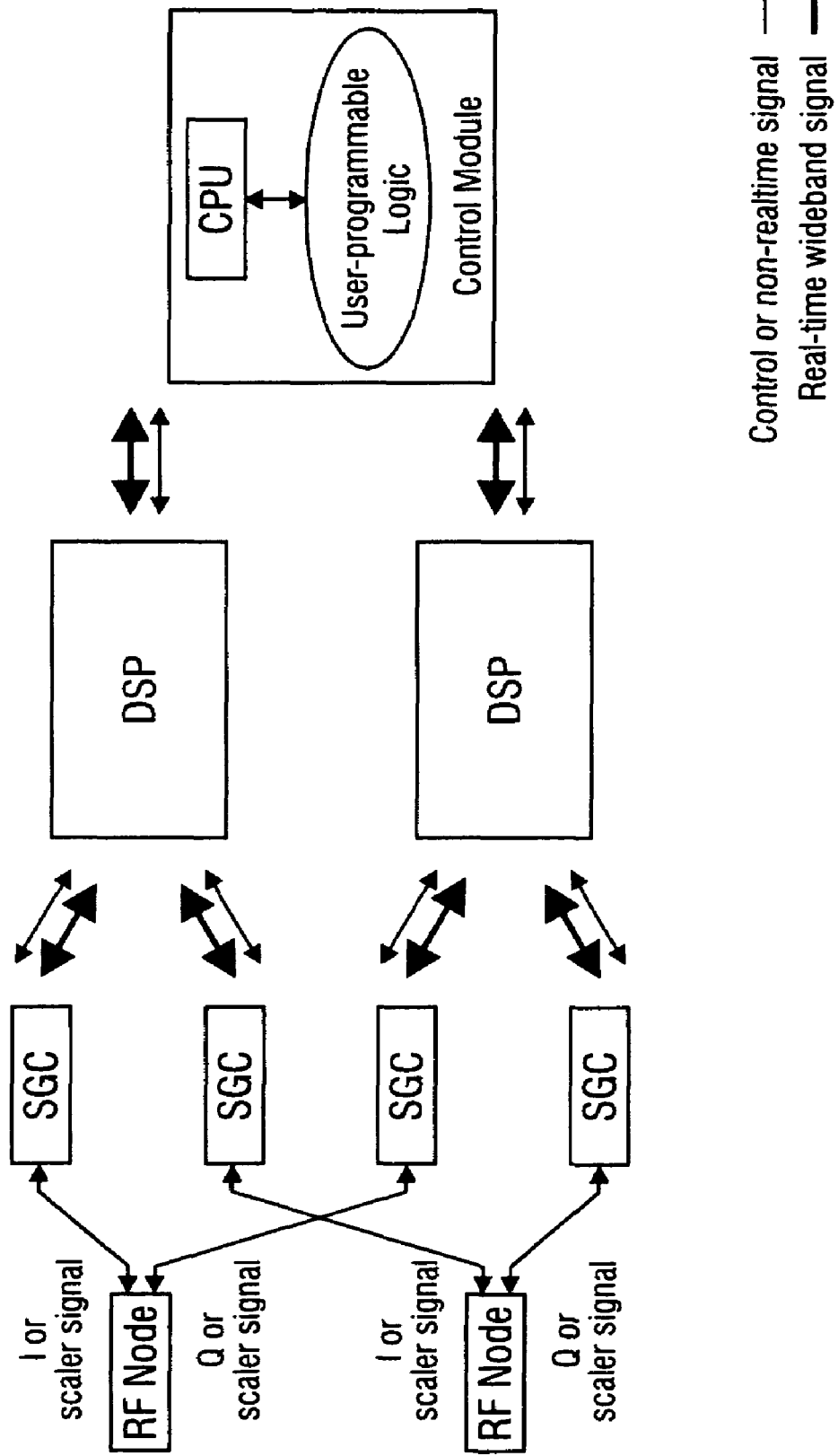
FIG. 10 illustrates how RF nodes can be connected, via SGCs, to multiple DSPs to increase the orthogonal paths available. That is especially useful for supporting I/Q signal processing.

In addition, multiple DSPs may operate in an orthogonal fashion (as shown in FIG. 10) to support richer RF propagation emulation. For instance, I and Q information from the RF nodes may be sent to distinct SGC modules: one for I and one for Q. The I modules can then all connect to a single DSP responsible for manipulating the I signal components while the Q DSP would do the same for the Q components. Also, each DSP module could operate on a distinct section of the emulated spectrum to allow for broader system bandwidth. In our current embodiment, each DSP can operate on over 100 MHz of spectrum with over 70 dB of dynamic range.

The number of supported RF nodes and path scale may also be increased by time-sharing the resources of the emulator among multiple channels. For instance, the DSP engine could be time-shared among several SGC modules operating below the DSP engine's clock rate.

The DSP engine can be used for signal generation in much the same way that the SGC module can.

The DSP engine can capture signals and send them to the control module in real-time. The DSP engine can receive signals in real-time from the control module. These signals can be stored and sent out to RF nodes as specified by the user. The DSP engine, the SGC module, or control module can also analyze signals.

The DSP engine may be connected to multiple control modules. In our current embodiment, each additional control module will displace an SGC module because they utilize the same ports.

The emulation control module 20, or controller, shown in FIG. 1 manages the entire emulation process and is divided into to sub-modules: the CPU module and the programmable logic module. The controller CPU is responsible for programming the programmable logic found on the SGC modules, the DSP engine, and the controller's programmable logic. The controller CPU is driven by user scripts and executable code that define:

The emulated physical environment. For instance, the number and IDs of emulated nodes (EmuNodes). The number and IDs of wireless interfaces for each EmuNode. The number and IDs of each antenna for each wireless interface (an RF Node actually represents an antenna).

Movement of EmuNodes and objects within the emulated physical environment.

The RF propagation environment. For instance, the number of channels, and the precise way that each channel should be modeled.

The precise mapping between emulated antennas and RF nodes.

The operation of applications on each EmuNode. Users are able to control the execution of applications so that they can emulate user activity or run tests.

The precise mapping between emulated antennas and RF nodes.

The scripting and programmatic control on the control module allow for sophisticated test scenarios where emulation behavior is determined at runtime. For instance, the behavior of a user watching a streaming video on a wireless LAN could be emulated. If the video quality became poor due to emulated marginal signal conditions (as controlled by the emulation scenario), the emulation could include code that would emulate user movement as the user searched for a better signal.

The advanced programmatic interface is enabled by allowing user code to be dynamically linked into the core emulator code. Our current embodiment uses Java for this purpose.

The CPU control module typically will assist the DSP in RF propagation modeling at a high level.

The controller programmable logic communicates with the DSP engine at the same rate as the SGC modules. This allows the controller programmable logic to send and receive wideband signals to and from the DSP.

The controller programmable logic acts as an intermediary between the controller CPU and the DSP modules.

A completely programmable emulator according to the present disclosure for performing wireless network emulation between a plurality of RF nodes is comprised of multiple, programmable signal conversion and generator modules (SGC), one or more digital signal processing (DSP) modules, and a control module. The multiple programmable signal generation and conversion (SGC) modules will be capable of some or all of:

i) Digitizing RF signals in real-time from half duplex or simplex RF Nodes.

ii) Converting real-time digital signals to analog and sending them to half duplex or simplex RF Nodes.

iii) Operating as an RF node.

iv) Operating as an extension of an RF Node to emulate an RF node with additional capabilities.

v) Sending real-time wideband output to one or more DSP modules.

vi) Accepting real-time wideband signal input from one or more DSP modules.

vii) Additional user-programmable in-module computation.

viii) Working in concert with other SGCs to perform i through vii.

ix) Working in concert with another SGC to support a full duplex RF node.
x) Sending control data to the DSP.
xi) Receiving control data from the DSP.

Each of the digital signal processing (DSP) modules will be capable of some or all of:
i) Accepting a real-time wideband input signal from each attached SGC.
ii) Accepting control data from each attached SGC.
iii) Sending a real-time wideband output signal to each attached SGC.
iv) Sending control data to each attached SGC.
v) Computing the output to each SGC as a function of the input signal from all other SGCs and signal sources or a subset of thereof.
vi) Generating additional user-defined signals internally.
vii) Storing signals from SGCs or any other input source.
viii) Using stored signals as a signal source.
ix) Altering the functions in iii and signal generating function in iv in real-time on a per-sample basis.
x) Sending one or more real-time wideband signals to the control module.
xi) Accepting one or more real-time wideband signals from the control module.
xii) Accepting control input from the control module.
xiii) Sending control output to the control module
xiv) Altering behavior in real-time up to a per-sample basis.
xv) Additional user-programmable in-module computation.
xvi) Performing i through xv for the purpose of RF propagation environment emulation.
xvii) Working in concert with other DSPs to perform i through xvi.

The control module will be capable of some or all of:
i) Programming the SGC modules.
ii) Programming the DSP module(s).
iii) Sending real-time wideband signals to the DSP module(s).
iv) Receiving real-time wideband signals from the DSP module(s).
v) Sending control data to the DSP module(s).
vi) Receiving control data from the DSP module(s).
vii) Emulating node movement about physical environment in real time.
viii) Controlling the emulation of the RF propagation environment in the DSP(s).
ix) Controlling the operation of the devices to which the RF Nodes are attached in real time.
x) Coordinating vii and viii with ix.

FIG. 21 shows several sample configurations of host devices, RF nodes, control daemons, and SGC modules. The control daemons shown running on host devices and proxies allow the devices to be controlled by the emulation controller. FIG. 21(a) illustrates how a device such as a laptop with a wireless LAN card can be connected to the emulator by connecting a single antenna port to an SGC module. The control daemon can run directly on this type of device. FIG. 21(b) is similar to 21(a) except that the device has two antennas (e.g. for diversity) connected to the emulator by connecting each antenna port to its own SGC. FIG. 21(c) extends 21(b) to the 4-antenna case which might be used for beam forming or for MIMO communication. FIG. 21(d) illustrates that devices that don't support control daemons may be connected to the emulator though they will need to be operated manually if no control proxy is used. FIG. 21(e) shows a device that can't run a control daemon, but that is being assisted by a CPU-based proxy capable of running a control daemon. In this case, it is the responsibility of the proxy to translate the control signals from the emulation controller into actual control of the device (e.g. by sending device specific commands over an RS-232 cable).

In the next section we discuss a proof-of-concept implementation of the emulator architecture just presented. We then present several experiments that demonstrate how this prototype can support a wide range of experiments.

Section 2 Proof-of-Concept Prototype

Implementation Section 2.1 Description

To demonstrate the feasibility of the wireless emulator 10 before we constructed a full network emulator, we constructed a small prototype designed to validate the emulator's primary functionality by emulating signal propagation between three laptops on a single 802.11b "non-overlapping channel". This prototype was constructed using discrete components. The results obtained with this prototype show that the approach that we advocate is capable of providing powerful wireless emulation capabilities. We first discuss our prototype's hardware implementation followed by a discussion of the control software.

Figure 11:
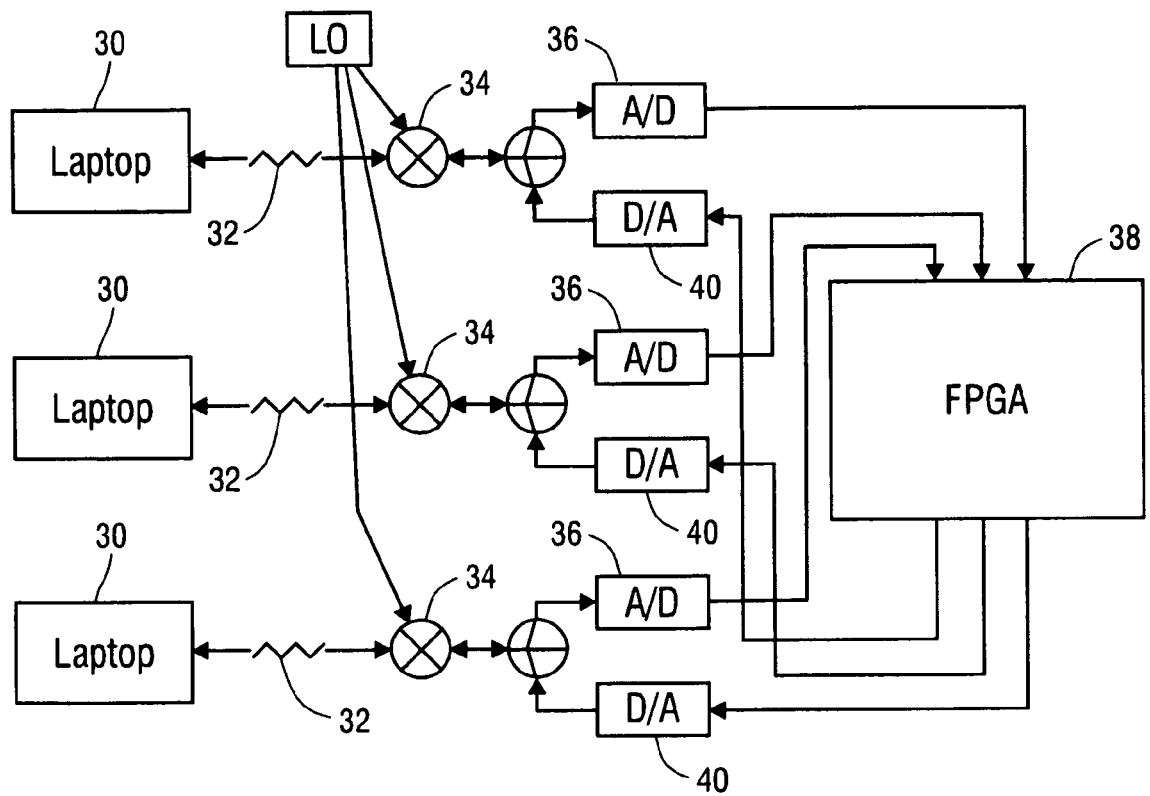
FIG. 11 illustrates the hardware architecture of our initial prototype.

FIG. 11 shows the hardware architecture of the prototype. Each laptop 30 operates on 802.11b Channel 11 which is centered at 2.462 GHz and contains its main spectral elements from 2.451 GHz to 2.473 GHz. The outgoing signal from each laptop 30 is first attenuated via attenuator 32 and then mixed via mixer 34 with a 2.449 GHz LO signal. The resulting output from the mixers 34 (ignoring the signal image) is a signal ranging from 2 to 24 MHz. This signal is then fed into an A/D board 36 for sampling. Each A/D board 36 generates 12-bit digital samples of the incoming signal at 52 Msps, and sends them to an FPGA 38 for processing. (In contrast, our current device samples 12 bits wide at 210 Msps.)

Inside the FPGA 38, the signals are processed to emulate a physical environment. Each outgoing signal is then sent to a D/A board 40 for reconstruction. It is then mixed and attenuated before arriving at the destination wireless card's antenna port.

Between the three laptops 30 in our prototype, there exist a total of six point-to-point signal channels. For each of these channels, the emulation controller 20 (shown in FIG. 1) is capable of dynamically adjusting the attenuation from the source to the destination by dynamically setting the scaling factors mentioned previously. Hence, for each of the six signal paths, the emulator can recreate effects such as large-scale path loss and small-scale fading. The emulator's noise floor is either generated by replacing an RF node with a noise generator, by using the noise floor naturally present in the emulator, or by generating noise in the programmable logic.

The use of an FPGA-based DSP gives the prototype the ability to support more complex signal modeling than we have yet implemented. Moreover, the FPGA's "program" can be customized for each individual experiment. Also, one ore more noise generators could be programmed into the FPGA to provide precise control over the noise floor.

The emulation controller 20 is driven by scripts that specify each node's movement and communication as discussed supra. As the RF nodes move about in the emulated physical space, the emulation controller 20 continuously computes attenuation of each signal path and the scaling factors required to emulate this attenuation (a simple path loss model based on measurements in CMU's business school is used). After computation, these scaling factors are sent to the FPGA-based DSP 18. The emulation controller 20 also generates a visual display of node location in the emulated physical environment.

Under direction of the emulation controller 20, we can generate network traffic between any pair of nodes 30. The emulation controller 20 is able to synchronize this traffic with node 30 movement. If desired, however, nodes 30 can be made to generate traffic manually. This is most useful for scenarios in which nodes are stationary.

Implementation Section 2.2 Validation

We now present a simple validation of the operation of the prototype by examining two key properties: fidelity and isolation.

Figure 12:
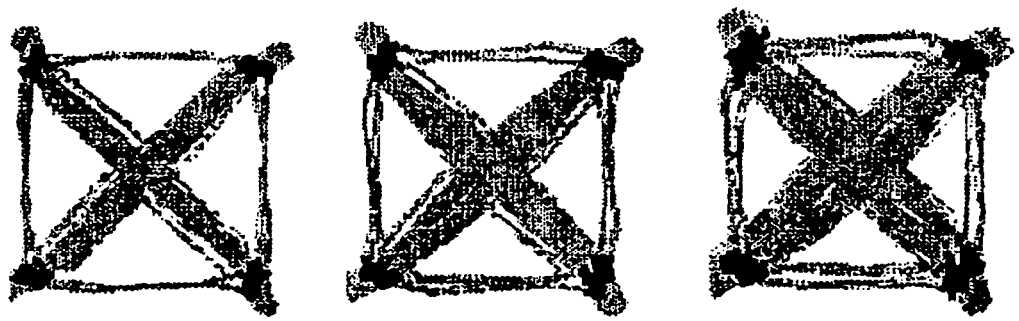
FIG. 12 compares the modulation fidelity of an 802.11 signal passing through the prototype (c) with the direct output of an 802.11 card (a).

While the prototype is simple, signal propagation fidelity is reasonably accurate. This can be quantified by measuring error vector magnitude (EVM) which is the relative difference between ideal signal constellation points and observed constellation points. FIG. 12 compares the modulation fidelity of an 802.11 signal passing through the prototype (c) with the direct output of an 802.11 card (a). For each case, this figure shows the measured constellation, and EVM. Qualitatively this figure shows that the prototype adds a small amount of error to the modulation. This is quantified by an EVM difference of about 2.9%. FIG. 12(b) shows the same measurement for a digitized signal that bypasses our FPGA-based DSP engine. The degradation seen in (c) relative to (b) implies that a good deal of the undesired noise in the prototype is being introduced in digital transmission to or from the DSP engine. In contrast, our device has minimal EVM degradation.

Figure 13:
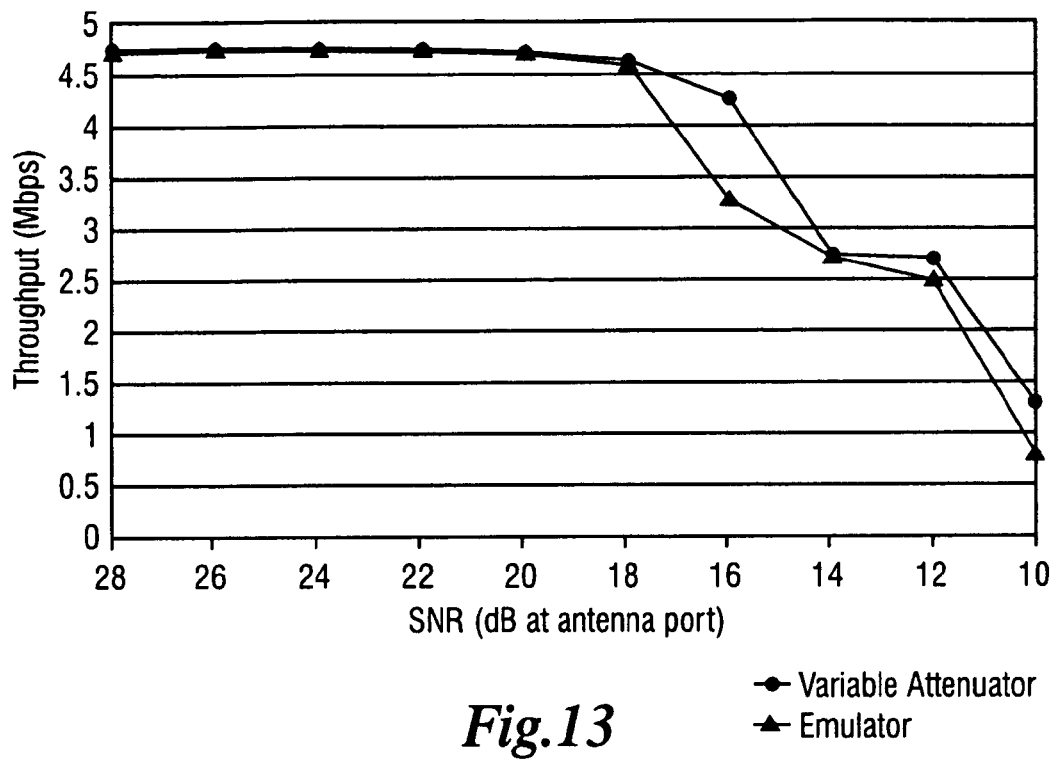
FIG. 13 shows the transport level fidelity of the prototype.

FIG. 13 shows that the prototype's physical layer fidelity translates into transport level fidelity; this figure compares TCP throughput for two laptops connected via a variable attenuator versus two laptops connected via the prototype. Each data point is an average of 20 trials. Confidence intervals are omitted as they are very tight. Clearly high end performance is quite close with performance diverging at low SNR values.

An important benefit of the prototype is the ability to conduct experiments in isolation from external sources of interference. While the prototype is not yet specifically shielded against external interference, we performed simple measurements to determine the degree of isolation that the prototype obtained. Using a laptop external to the prototype, we generated a broadcast ping flood at 2 Mbps. With this external node placed at various distances from the prototype, we then measured the TCP throughput between two nodes internal to the prototype. When TCP throughput was unaffected by the ping flood, we inferred that the internal prototype nodes were no longer able to sense the carrier of the external interfering node. Our tests indicate that our prototype is isolated from external nodes that are approximately 18 meters or further away in our environment. We expect to significantly reduce this distance when we explicitly address this issue. Nevertheless, compared to a wireless testbed, the prototype has greatly reduced the possible locations of interfering sources to a relatively small geometric space.

By altering this isolation test to measure internal isolation, we were able to verify that nodes attached to the prototype were effectively isolated against undesired transmission to each other despite their close proximity. In addition, we verified that the signal propagation between laptops in the prototype is unaffected by the movement of nearby people or objects.

Section 3 Sample Experiments

We now present a series of experiments that provide a small sampling of our wireless prototype's capabilities. For each of the experiments presented, obtaining repeatable and realistic results using traditional network experimentation methods would be difficult. In each experiment, three RF nodes were connected to our prototype: "Orchid", "Hermes", and an interferer ("Nice" or a Bluetooth source).

Section 3.1 Hidden Terminal

We first use our prototype to analyze how the "hidden terminal" problem affects 802.11 networks. Evaluating the hidden terminal problem in a real world environment is troublesome because it is difficult to determine if nodes are in carrier sensing range of each other. Moreover, carrier sensing range constantly fluctuates in the real world. This experiment highlights our prototype's ability to overcome these difficulties by providing precise, independent control over the signal paths between all nodes. This allows us to evaluate the hidden terminal problem by simply commanding the emulator to "disconnect" the desired nodes while leaving the communication between other nodes unaffected.

Figure 14:
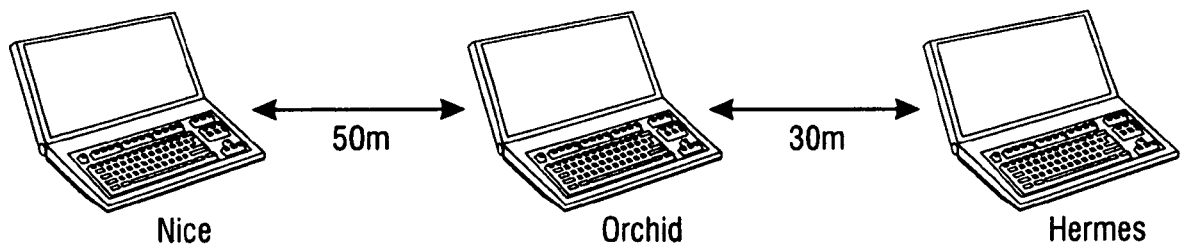
FIG. 14 demonstrates one configuration of how experiments with "hidden terminals" were set up.

As illustrated in FIG. 14 we arranged our three nodes in a line with all nodes in range of each other. (For simplicity we will speak of spatial relationships in our virtual physical environment as if they were based in a real physical environment). We then measured TCP throughput from Hermes to Orchid while Nice was used to generate interfering traffic using a unicast ping flood directed at Orchid.

Figure 15:
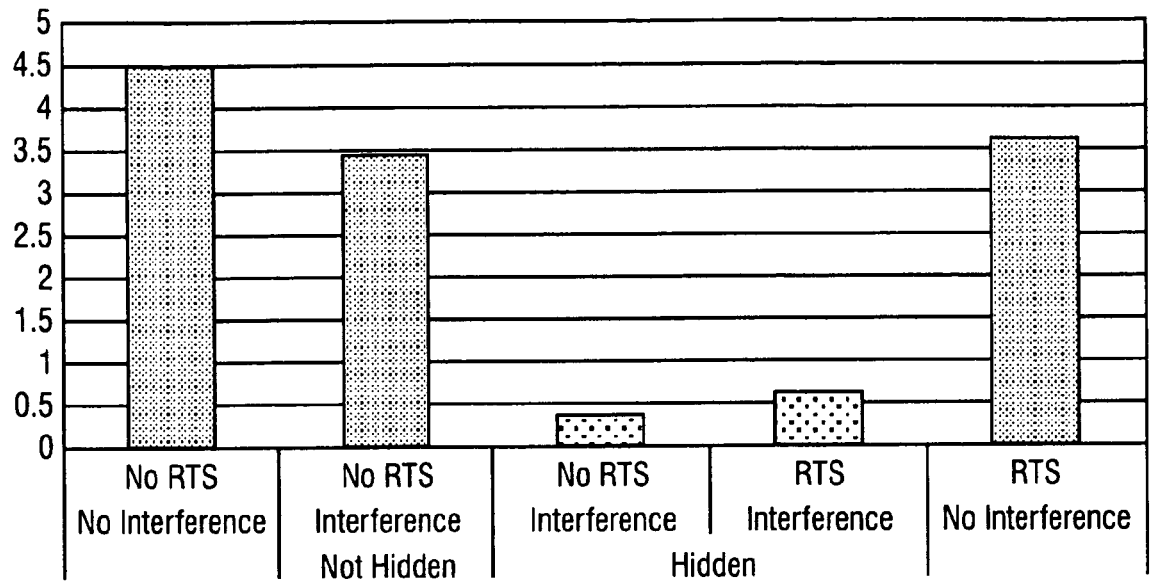
FIG. 15 shows the results of the "hidden terminal" experiments.

As shown in the FIG. 15 "No RTS, No Interference" test, throughput between Orchid and Hermes is excellent when there is no interference (each value is an average of 25 trials with 95% confidence intervals shown). In the "No RTS, Interference, Not Hidden" test, we see that when Nice begins interfering, throughput is still quite good (ping packets are much smaller than the TCP packets).

We then created a hidden terminal situation by artificially "severing" the link between Hermes and Nice while leaving the other communication paths unaffected. (The ability to create a hidden terminal situation without "moving" the nodes allows us to directly compare results between the hidden and non-hidden tests.) The "No RTS, Interference, Hidden" test shows that throughput between Orchid and Hermes drops dramatically in this case.

We next analyzed the efficacy of 802.11's RTS/CTS mechanism at overcoming the hidden terminal problem by repeating the previous tests with Hermes set to always use RTS/CTS for frames over 200 bytes. The "RTS, Interference, Hidden" test shows that RTS/CTS is able to double throughput; nevertheless throughput is still much lower than when the interferer was not hidden. Comparing the final "RTS, No Interference" test with the "No RTS, No Interference" case shows that the overhead of RTS/CTS alone is roughly 1 Mbps. Further investigation (and coaxial-based verification) revealed that the cause of this underwhelming improvement was the failure of RTS/CTS to prevent rate fallback. The ability to analyze this type of subtle behavior in a controlled environment is a key advantage of our emulator.

Section 3.2 Directional Antennas

Figure 16:
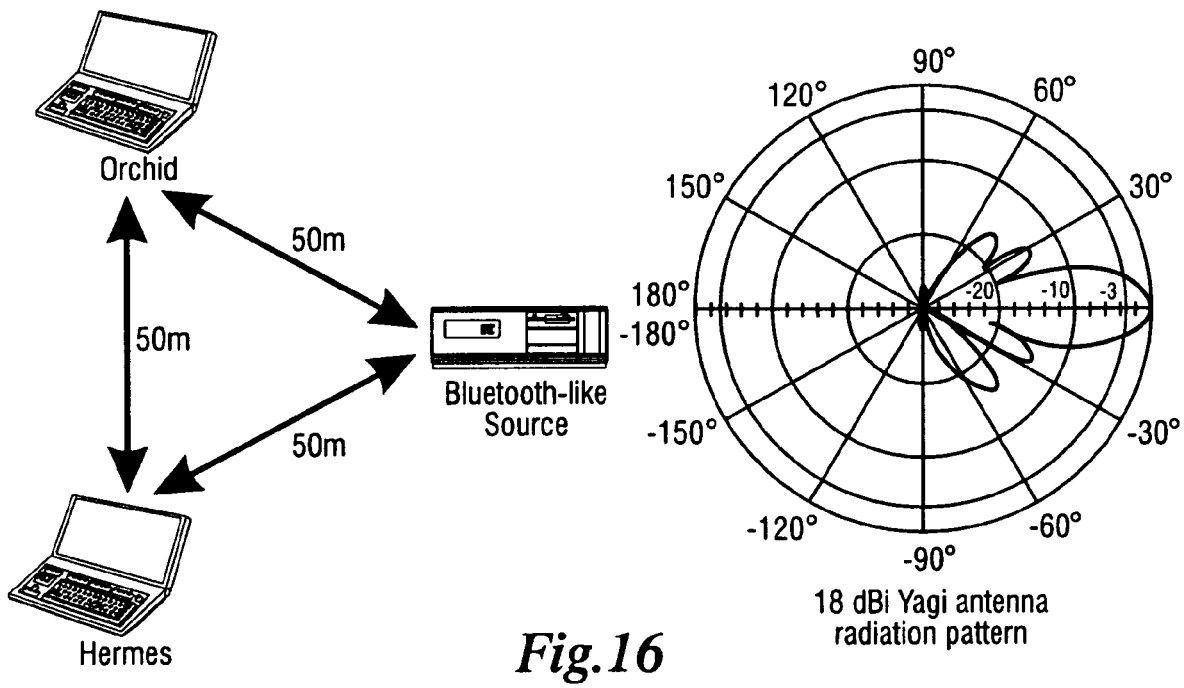
FIG. 16 shows the topology and radiation pattern for experiments using directional antennas.

Complete control over signal propagation also allows our prototype to emulate arbitrary types of antennas. In this experiment, we analyzed the ability of directional antennas to improve range and spatial reuse by minimizing the effects of interfering Bluetooth-like traffic. As shown in FIG. 16, each node was positioned 50 meters from the other two nodes.

Figure 17:
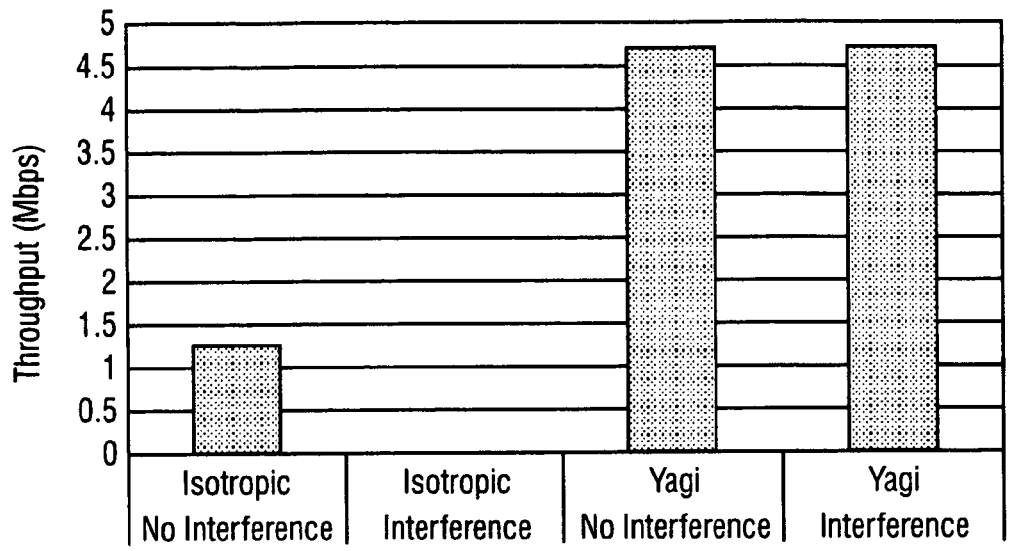
FIG. 17 shows the results of communication between two test nodes in four scenarios.

FIG. 17 shows the results of communication between Hermes and Orchid for four scenarios (each value is an average of 25 trials with 95% confidence intervals shown). In the "Isotropic, No Interference" test, Hermes and Orchid communicate with omnidirectional antennas with no interference (using a TCP benchmark with traffic from Orchid to Hermes). Communication is only around 1.25 Mbps due to the distance between the nodes.

In the "Isotropic, Interference" test, Hermes and Orchid communicate as before, but the Bluetooth source is configured to broadcast a constant 15 dBm signal with Bluetooth modulation. TCP throughput between Orchid and Hermes is not possible in this case.

The "Yagi" tests then repeat the "Isotropic" tests, but with 18 dBi Yagi antennas attached to Orchid and Hermes. These antennas are aimed directly at each other. FIG. 16 shows the radiation pattern for this antenna. Note that for Orchid and Hennes, the Bluetooth source lies along a side lobe with approximately 22 dB and 18 dB respectively less gain than the main lobe. The results of these tests show that the directional antennas successfully increase communication range and also mitigate the effects of interference.

Section 3.3 Mobility

Figure 18:
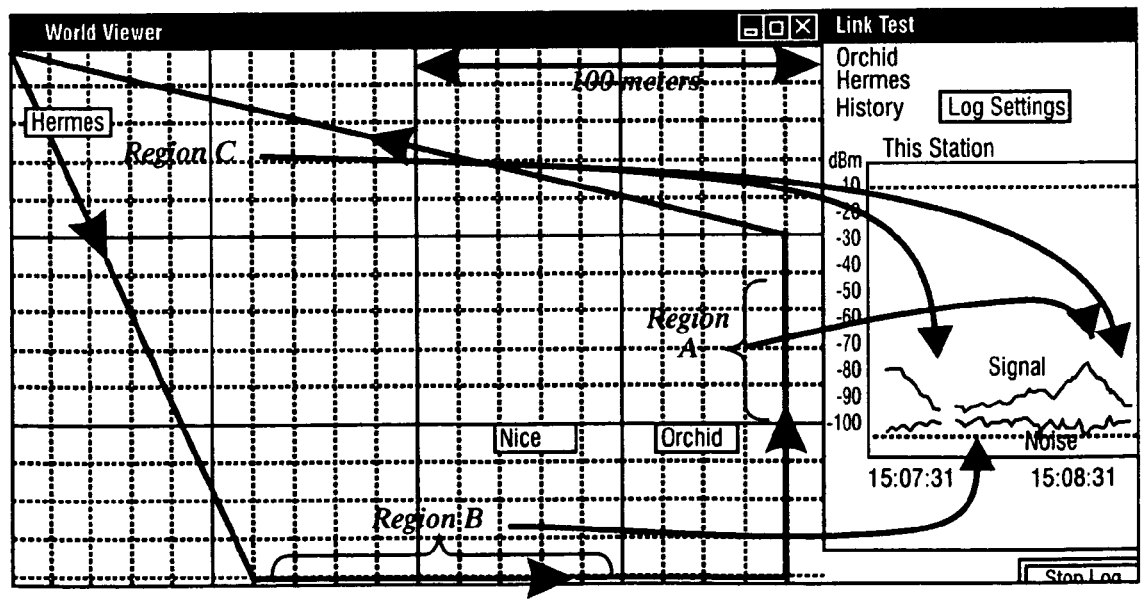
FIG. 18 shows portions of two computer screen captures gathered during mobility experiments.

The mobility experiment illustrates our prototype's ability to easily emulate movement in a physical space, and to coordinate this movement with the transmission of data in a controlled and repeatable manner. FIG. 18 contains two screen captures gathered during the operation of this scenario (with some additional explanatory text and illustrations superimposed on the screen captures). The "World Viewer" window on the left is a two-dimensional projection of the emulated physical environment. The window on the right is the Orinoco Link Test utility which performs a link layer ping and reports signal and noise measurements.

Figure 19:
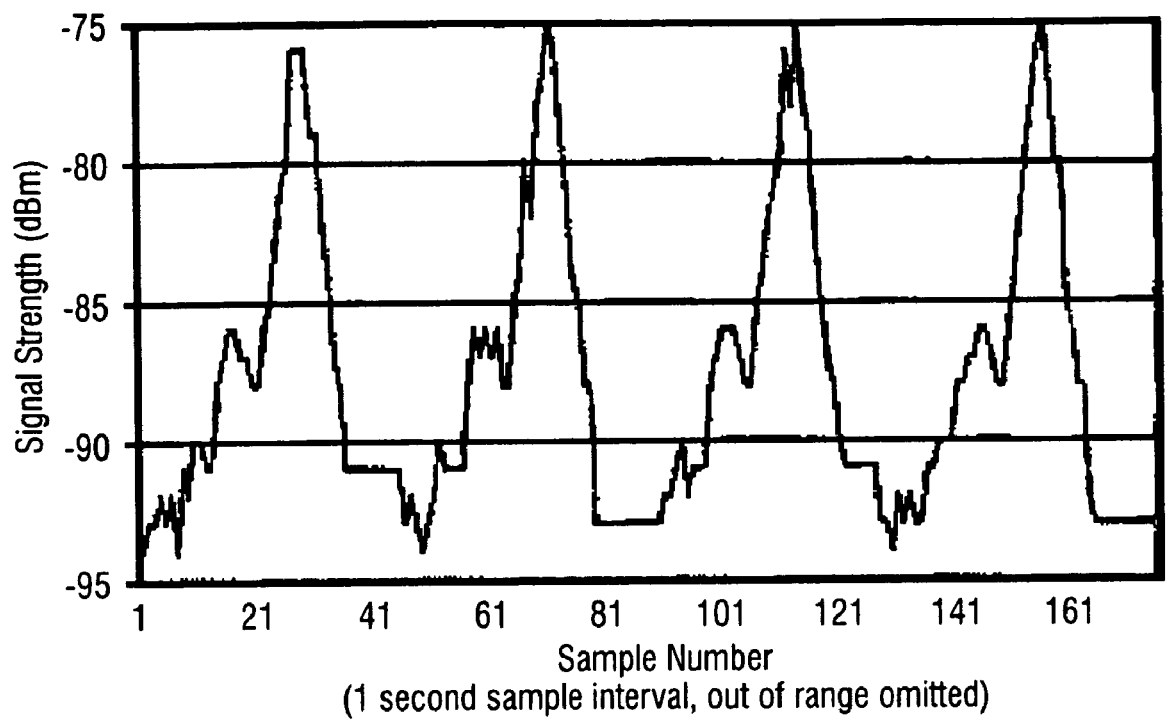
FIG. 19 shows the signal strength from one node measured by another node's wireless card at one second intervals.

As illustrated in the World Viewer window, Orchid and Nice were stationary during this experiment while Hermes moved in a counterclockwise circuit around them. FIG. 19 shows the signal strength from Hermes measured by Orchid's wireless card at one second intervals over four circuits, and illustrates our prototype's ability to emulate the effects of mobility at the physical layer in a repeatable fashion. This test also demonstrated our prototype's ability to create an "out of range" situation as demonstrated by the gaps in the measurements recorded by the Orinoco Link Test program when Hermes was most distant from Orchid (Region C).

At two points in this circuit, Orchid measured TCP performance by sending a large amount of data to Hermes. The emulation controller ensured that these measurements were synchronized with node movement and occurred at the same location each time. The first transmission was initiated when Hermes was near Orchid and the signal strength between the two nodes was strong (Region A). The second test was initiated far away where the signal was weak (Region B). Table 1 shows the results of these tests averaged over 20 circuits. The small standard deviation of the Region A throughput demonstrates that our prototype's control over the physical layer can translate into repeatable TCP performance despite the inherent variability from sources such as the operating system. As the signal strength becomes weaker, however, these higher level factors can produce some variation in results as evidenced by the higher standard deviation seen in Region B. Importantly, the statistical properties of the results are constant.

TABLE 1

Regional TCP Throughput (Mbps)

| Location | Average | Standard Deviation |
|---|---|---|
| Region A | 4.64 | 0.0343 |
| Region B | 1.80 | 0.225 |

Section 4 Signal Propagation Modeling

With our ability to completely control wireless signal propagation comes the challenge of modeling or recreating propagation in an appropriate manner for a given experiment. Fortunately, unlike wireless simulators, we are freed from the task of emulating radio behavior in conjunction with signal propagation modeling: we simply pick a suitable signal propagation model, compute each receiver's received signal, and let the radio decide what happens. We do not need to make any assumptions regarding any radio issues such as "sensing range" or "interfering range". We now discuss several different methods of modeling wireless signal propagation in our emulator. We begin with signal propagation models that require no site specific information, and then discuss models that use increasing amounts of site specific information.

Large-Scale Path Loss

The signal propagation model most commonly used by simulators is a large-scale path loss model. Specifically, the received signal strength at each receiver (RSS) is computed as RSS=Pt+Gt−PL+Gr. Where Pt and Gt are the transmit power and antenna gain at the transmitter, PL is the path loss, and Gr is the antenna gain at the receiver. Large-scale path loss models simply compute PL as a function of distance between the transmitter and the receiver.

The Emulation Controller implements large-scale path loss by simply calculating the loss between nodes whenever the distance between them changes. These loss values are then sent into the emulator where they are used to control the attenuation of the signal path between two nodes.

Small Scale Fading

While large-scale fading models can accurately capture the average path loss between two points, on a short time scale the path loss between these points may vary substantially. To support this behavior, our emulator may add small scale fading on top of computed large-scale path losss.

We are currently leveraging the technique presented in Punnoose:RAWCON1999 to incorporate the Ricean and Raleigh statistical models of small-scale fading in our emulator. In our implementation, the fading parameters are computed offline, and are then loaded into our emulator's FPGA before emulation begins. At run time, these parameters are added to the large-scale path loss which causes short term variation with the desired statistical properties. Independent use of fading parameters allows independent, on-line modification of small-scale fading for each RF node.

Ray Tracing

The previous two methods required no site specific information other than picking the correct path loss models and model parameters. By incorporating site-specific information, it is possible to generate more accurate signal propagation models.

One technique that can be implemented in the emulator is to leverage ray tracing techniques. If the motion of nodes can be pre-computed off-line, ray-tracing techniques can be used to precisely compute all rays incident on each receiver at a given point in time. If motion cannot be pre-computed, then approximations can be made.

At runtime, the pre-computed series of attenuation over time values for each signal path can then be used to set path attenuation inside the DSP Engine.

Capturing and Replaying Signal Behavior

One simple method of accurately modeling signal propagation is to measure the signal propagation in a given environment and then to replay it. We have implemented a signal capture system using standard wireless NICs that measures path loss in a physical environment. This system works by constantly sending small packets from each transmitter to be emulated and receiving these packets on each receiver being emulated.

Our emulator then simply replays the observed traces of signal strength. To demonstrate this capability, we captured path loss from a car driving along a freeway at 60 MPH to a base station located at a fixed point near the freeway.

The traffic source was a 23 dBm 802.11b source attached to a 5 dBi isotropic antenna placed on the roof of the passing car. The receiver used the same hardware as the sender, but with the antenna placed on the roof of a stationary car at the side of the freeway. As the sender passed, it continuously broadcast small 1 Mbps broadcast packets which were recorded by the receiver. The result of this test was signal strength measurements with 1 ms granularity. We then post-processed this trace to extract the timestamped signal and noise measurements.

Figure 20:
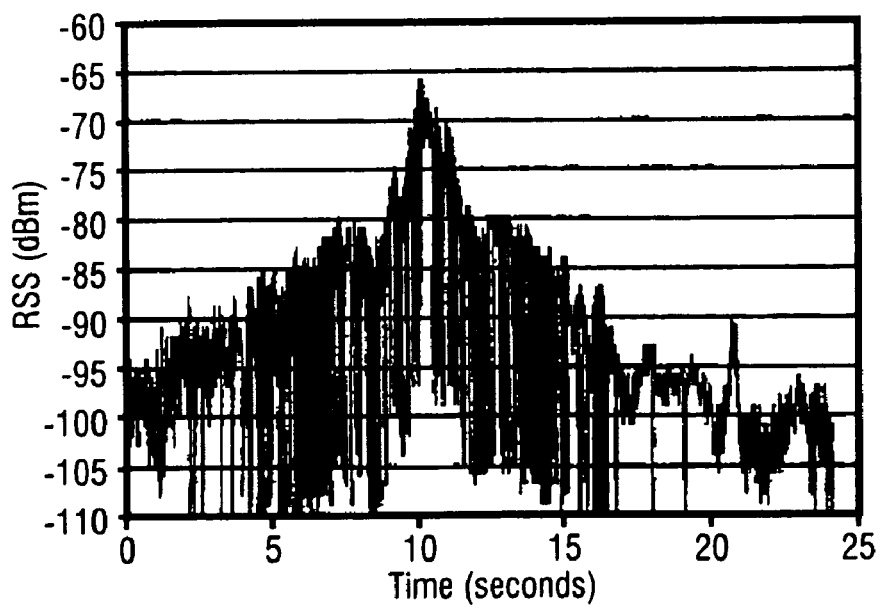
FIG. 20 shows a trace extracted by capturing a freeway driveby.

FIG. 20 shows the trace extracted using this method. Our emulator then simply reads, and recreates the observed path loss at the given time. Our current trace replaying software is limited to 2.5 ms granularity.

Channel Sounding

A more sophisticated method of measuring signal propagation in a physical environment is to use specialized hardware to precisely measure the "impulse response" of the channel. Such measurements can be difficult to obtain because they require specialized hardware. Once obtained, however, our emulator is capable of replaying these measurements by setting the attenuation and delay of each signal path in the DSP Engine according to the values extracted from the channel sounding.

Scaling

Much of the above discussion assumes that we are independently modeling the RF channels between all nodes. This is not always necessary. The emulator may employ channel models that sacrifice channel independence and fidelity to increase the number of RF nodes supported or to increase the fidelity of important channels.

Conclusion

Understanding and improving wireless network performance is increasingly important. Unfortunately, repeatable experimentation and controlled testing with real wireless nodes operating in a real environment is not feasible. For this reason, most wireless network research has relied on evaluation via simulation. Wireless simulators do not, however, completely duplicate real hardware in an operational environment, and the correctness of wireless simulation is difficult to validate.

We have overcome these obstacles by developing a wideband, programmable network emulator capable of providing real-time, scalable modeling of the wireless communication channel between all pairs of nodes attached to this emulator. This approach maintains much of the realism of wireless testbeds without sacrificing the repeatability of simulation. Any of a wide variety of models may be used. Our device can emulate nodes or modify the capabilities of a real RF node. We have developed a proof-of-concept prototype, and have used this prototype to show that physical layer wireless emulation is a powerful means of enabling realistic and repeatable wireless experimentation. We have developed a wideband, scalable network emulator that vastly improves on the capabilities demonstrated in our prototype. Our device may be used in a variety of applications such as characterization of equipment, interoperability testing, supporting standards compliance, supporting testing in product development, side-by-side comparisons of network protocols (at all layers of the stack), among others.

While the present invention has been described in conjunction with preferred embodiments thereof, those of ordinary skill in the art will recognize that modifications and variations of the disclosed embodiments are possible. Such modifications and variations fall within the scope of the present invention which is limited only by the following claims.

What is claimed is:

1. An emulator for emulating a wireless network comprised of a plurality of wireless nodes, said emulator comprising:
   a controller for providing channel characteristic information; and
   a field programmable gate array (FPGA) for receiving said channel characteristic information and for receiving a plurality of signals from at least five wireless nodes, said FPGA for processing said signals according to said channel characteristic information from said controller to emulate signal propagation within each channel of a physical transmission medium resulting from all pairings of all wireless nodes.

2. The emulator of claim 1 wherein said processing comprises modeling one of large-scale path loss and small-scale fading, and wherein said channel characteristic information comprises generated parameters.

3. The emulator of claim 1 wherein said processing comprises ray tracing and said channel characteristic information comprises pre-computed parameters.

4. The emulator of claim 1 wherein said channel characteristic information comprises captured and replayed signal behavior.

5. The emulator of claim 1 in combination with a plurality of host devices each having a wireless node, said emulator comprising one of an analog to digital or digital to analog converter connected between said wireless nodes and said FPGA.

6. An emulator for emulating a wireless network comprised of a plurality of wireless nodes, said emulator comprising:
   a controller for emulating the movements of at least five wireless nodes within an emulated space in real time, said controller for providing channel characteristic information based on said emulated movements; and
   an emulation engine for receiving said channel characteristic information and for receiving a plurality of signals from the wireless nodes, said emulation engine for processing said signals in real time according to said channel characteristic information from said controller to emulate signal propagation in each channel of a physical transmission medium resulting from all pairings of all wireless nodes in real time.

7. The emulator of claim 6 in combination with a plurality of host devices each having a wireless node, said emulation engine comprising a plurality of signal generation and conversion cards each responsive to one of said wireless nodes and a programmable logic core responsive to said plurality of signal generation and conversion cards.

8. The emulator of claim 7 wherein said controller contains code for controlling the operation of said programmable logic core and said plurality of signal generation and conversion cards.

9. The emulator of claim 8 wherein said controller contains code for modifying the operation of one of said host devices and said wireless nodes.

10. The emulator of claim 7 wherein said signal generation and conversion cards each contain an analog to digital and a digital to analog converter.

11. The emulator of claim 6 wherein said processing comprises one of:
modeling one of large-scale path loss and small-scale fading, and wherein said channel characteristic information comprises generated parameters; or
ray tracing, and wherein said channel characteristic information comprises pre-computed parameters.

12. An emulator for emulating a wireless network comprised of a plurality of wireless nodes, said emulator comprising:
a controller for emulating the movements of at least five wireless nodes within an emulated space, said controller providing channel characteristic information based on said emulated movements and control signals;
a programmable logic core for receiving said channel characteristic information and for receiving a plurality of signals from the wireless nodes, said programmable logic core for processing said received signals according to said channel characteristic information from said controller to emulate signal propagation in each channel of a physical transmission medium resulting from all pairings of all wireless nodes according to one of large-scale path loss, small-scale fading, ray tracing or replaying captured signal behavior; and
a plurality of signal generation and conversion cards interposed between said programmable logic core and said wireless nodes, said signal generation and conversion cards being responsive to said control signals.

13. The emulator of claim 12 wherein said channel characteristic information is one of generated, pre-computed or captured and replayed.

14. The emulator of claim 12 in combination with a plurality of host devices each having one of said wireless nodes, said signal generation and conversion cards having an analog to digital and a digital to analog converter.

15. The emulator of claim 14 wherein said controller contains code for modifying the operation of at least one of said programmable logic core, said signal generation and conversion cards, said host devices and said wireless nodes.

16. A method of emulating a wireless network comprised of a plurality of wireless nodes, said method comprising:
inputting channel characteristic information about signal propagation from a controller to a field programmable gate array (FPGA);
receiving in said FPGA a plurality of signals from at least five wireless nodes; and
processing in said FPGA said received signals according to said channel characteristic information from said controller to emulate signal propagation within each channel of a physical transmission medium resulting from all pairings of all wireless nodes.

17. The method of claim 16 wherein said processing comprises modeling one of large-scale path loss and small-scale fading, and wherein said channel characteristic information comprises generated parameters.

18. The method of claim 16 wherein said processing comprises ray tracing and said channel characteristic information comprises pre-computed parameters.

19. The method of claim 16 wherein said channel characteristic information comprises captured and replayed signal behavior.

20. The method of claim 16 additionally comprising one of converting an analog signal from each wireless node to a digital signal or converting a digital signal from the FPGA to an analog signal.

21. A method of emulating a wireless network comprised of a plurality of wireless nodes, said method comprising:
emulating the movements of at least five wireless nodes within an emulated space in real time;
providing channel characteristic information based on said emulated movements;
receiving said channel characteristic information and receiving a plurality of signals from the wireless nodes in an emulation engine; and
processing said signals in said emulation engine in real time according to said channel characteristic information to emulate signal propagation in each channel of a physical transmission medium resulting from all pairings of all nodes in real time.

22. The method of claim 21 additionally comprising executing a series of instructions for controlling the operation of said emulation engine.

23. The method of claim 21 additionally comprising one of executing a series of instructions for modifying the operation of said wireless nodes and executing a series of instructions for modifying the operation of a device hosting said wireless node.

24. The method of claim 21 additionally comprising converting an analog signal from each wireless node to a digital signal and converting a digital signal from the emulation engine to an analog signal.

25. A method of emulating a wireless network comprised of a plurality of wireless nodes, said method comprising:
emulating the movements of at least five wireless nodes within an emulated space with a controller;
providing channel characteristic information based on said emulated movements;
receiving said channel characteristic information and receiving a plurality of signals from the wireless nodes in a programmable logic core; and
processing in said programmable logic core said received signals according to said channel characteristic information to emulate signal propagation in each channel of a physical transmission medium resulting from all pairings of all wireless nodes according to one of large-scale path loss, small-scale fading, ray tracing or replaying captured signal behavior.

26. The method of claim 25 wherein said providing channel characteristic information comprises one of generating parameters, pre-computing parameters or capturing and replaying signals.

27. The method of claim 25 additionally comprising converting an analog signal from each wireless node to a digital signal and converting a digital signal from the programmable logic core to an analog signal.

28. The method of claim 25 additionally comprising executing code to modify the operation of one of said wireless nodes, a device hosting said wireless nodes, and said programmable logic core.

* * * * *

UNITED STATES PATENT AND TRADEMARK OFFICE
CERTIFICATE OF CORRECTION

| | | |
|---|---|---|
| PATENT NO. | : 7,698,121 B2 | Page 1 of 1 |
| APPLICATION NO. | : 11/274530 | |
| DATED | : April 13, 2010 | |
| INVENTOR(S) | : Peter A Steenkiste and Glenn Judd | |

It is certified that error appears in the above-identified patent and that said Letters Patent is hereby corrected as shown below:

Column 1, Line 25, after "work environments" insert -- . --.

Column 4, Line 27, delete "Illustrates" and substitute therefore -- illustrates --.

Column 7, Line 67, delete "into to sub-modules" and substitute therefore -- into two sub-modules --.

Column 10, Line 55, delete "Also, one ore" and substitute therefore -- Also, one or --.

Column 13, Line 10, delete "Hennes" and substitute therefore -- Hermes --.

Signed and Sealed this

Fifteenth Day of June, 2010

David J. Kappos
*Director of the United States Patent and Trademark Office*